(12) United States Patent
Otsuka et al.

(10) Patent No.: US 8,635,547 B2
(45) Date of Patent: Jan. 21, 2014

(54) DISPLAY DEVICE AND DISPLAY METHOD

(75) Inventors: Noritaka Otsuka, Chiba (JP); Hidetoshi Ichioka, Tokyo (JP); Kazuhide Sasamoto, Tokyo (JP); Takuo Ikeda, Tokyo (JP); Kunihito Sawai, Kanagawa (JP)

(73) Assignee: Sony Corporation (JP)

( * ) Notice: Subject to any disclaimer, the term of this patent is extended or adjusted under 35 U.S.C. 154(b) by 562 days.

(21) Appl. No.: 12/655,816

(22) Filed: Jan. 7, 2010

(65) Prior Publication Data

US 2010/0180222 A1     Jul. 15, 2010

(30) Foreign Application Priority Data

Jan. 9, 2009   (JP) ................. P2009-003974

(51) Int. Cl.
G06F 3/048     (2013.01)
G06F 3/00      (2006.01)

(52) U.S. Cl.
USPC ........... 715/768; 715/769; 715/770; 715/784; 715/786

(58) Field of Classification Search
USPC .......................... 715/768, 769, 770, 784, 786
See application file for complete search history.

(56) References Cited

U.S. PATENT DOCUMENTS

| | | | | |
|---|---|---|---|---|
| 5,506,951 A * | 4/1996 | Ishikawa | | 715/786 |
| 5,533,225 A * | 7/1996 | Ellis | | 15/104.92 |
| 5,617,114 A * | 4/1997 | Bier et al. | | 345/634 |
| 5,638,523 A * | 6/1997 | Mullet et al. | | 715/855 |
| 5,798,752 A * | 8/1998 | Buxton et al. | | 715/863 |
| 5,847,708 A * | 12/1998 | Wolff | | 715/764 |
| 5,943,051 A * | 8/1999 | Onda et al. | | 715/786 |
| 5,943,679 A * | 8/1999 | Niles et al. | | 715/247 |
| 5,950,216 A * | 9/1999 | Amro et al. | | 715/209 |
| 6,012,073 A * | 1/2000 | Arend et al. | | 715/236 |
| 6,118,427 A * | 9/2000 | Buxton et al. | | 345/629 |
| 6,147,683 A * | 11/2000 | Martinez et al. | | 715/786 |
| 6,211,921 B1* | 4/2001 | Cherian et al. | | 348/565 |
| 6,333,753 B1* | 12/2001 | Hinckley | | 715/768 |
| 6,417,867 B1* | 7/2002 | Hallberg | | 345/660 |
| 6,445,398 B1* | 9/2002 | Gerba et al. | | 715/721 |
| 6,545,687 B2* | 4/2003 | Scott et al. | | 345/629 |
| 6,621,509 B1* | 9/2003 | Eiref et al. | | 715/836 |
| 6,690,401 B1* | 2/2004 | Stead | | 715/784 |
| 6,874,126 B1* | 3/2005 | Lapidous | | 715/711 |

(Continued)

FOREIGN PATENT DOCUMENTS

EP     1052849 A1    11/2000
JP     04060589 A     2/1992

(Continued)

OTHER PUBLICATIONS

European Search Report 09181047, dated Apr. 29, 2010.

(Continued)

*Primary Examiner* — Steven B Theriault
(74) *Attorney, Agent, or Firm* — Lerner, David, Littenberg, Krumholz & Mentlik, LLP

(57) ABSTRACT

A display device of present invention includes an operation input portion from which operation information is input by a user, a selection portion that selects a predetermined region on a display screen based on the operation information, and a scroll portion that scrolls the display screen in a state where a position of the selected predetermined region is held at a predetermined position.

11 Claims, 23 Drawing Sheets

(56) References Cited

U.S. PATENT DOCUMENTS

| | | | |
|---|---|---|---|
| 6,915,401 B2* | 7/2005 | Broussard et al. | 711/170 |
| 6,956,590 B1* | 10/2005 | Barton et al. | 345/684 |
| 7,065,710 B2* | 6/2006 | Hayashi et al. | 715/732 |
| 7,194,527 B2* | 3/2007 | Drucker et al. | 709/220 |
| 7,232,058 B2* | 6/2007 | Lee | 235/379 |
| 7,296,242 B2* | 11/2007 | Agata et al. | 715/793 |
| 7,313,764 B1* | 12/2007 | Brunner et al. | 715/784 |
| 7,320,105 B1* | 1/2008 | Sinyak et al. | 715/277 |
| 7,369,102 B2* | 5/2008 | Luke et al. | 345/9 |
| 7,383,497 B2* | 6/2008 | Glenner et al. | 715/231 |
| 7,383,503 B2* | 6/2008 | Banks | 715/273 |
| 7,386,801 B1* | 6/2008 | Horvitz et al. | 715/764 |
| 7,386,806 B2 | 6/2008 | Wroblewski | |
| 7,417,680 B2* | 8/2008 | Aoki et al. | 348/333.05 |
| 7,429,993 B2* | 9/2008 | Hui | 345/629 |
| 7,441,196 B2* | 10/2008 | Gottfurcht et al. | 715/740 |
| 7,487,462 B2* | 2/2009 | Good et al. | 715/778 |
| 7,509,321 B2* | 3/2009 | Wong et al. | 1/1 |
| 7,519,920 B2* | 4/2009 | Jarrett et al. | 715/785 |
| 7,557,818 B1* | 7/2009 | Ubillos et al. | 345/684 |
| 7,564,548 B2* | 7/2009 | Flanders et al. | 356/301 |
| 7,607,150 B1* | 10/2009 | Kobayashi et al. | 725/41 |
| 7,629,966 B2* | 12/2009 | Anson | 345/173 |
| 7,657,845 B2* | 2/2010 | Drucker et al. | 715/833 |
| 7,681,149 B2* | 3/2010 | Lahdesmaki | 715/841 |
| 7,703,043 B2* | 4/2010 | Utsuki et al. | 715/830 |
| 7,705,858 B2* | 4/2010 | Ubillos et al. | 345/619 |
| 7,716,604 B2* | 5/2010 | Kataoka et al. | 715/835 |
| 7,719,548 B2* | 5/2010 | Ubillos et al. | 345/684 |
| 7,725,837 B2* | 5/2010 | Wong et al. | 715/815 |
| 7,737,995 B2* | 6/2010 | Vronay et al. | 345/619 |
| 7,761,812 B2* | 7/2010 | Ostojic et al. | 715/835 |
| 7,779,346 B2* | 8/2010 | Buczek | 715/227 |
| 7,783,983 B1* | 8/2010 | Mayers et al. | 715/764 |
| 7,814,439 B2* | 10/2010 | Fitzmaurice et al. | 715/856 |
| 7,895,533 B2* | 2/2011 | Fagans | 715/838 |
| 7,904,797 B2* | 3/2011 | Wong et al. | 715/200 |
| 7,908,566 B2* | 3/2011 | Wilcox et al. | 715/784 |
| 7,917,865 B2* | 3/2011 | Saijo et al. | 715/784 |
| 7,995,078 B2* | 8/2011 | Baar | 345/660 |
| 8,122,379 B2* | 2/2012 | Sakuyama et al. | 715/838 |
| 8,225,225 B2* | 7/2012 | Jetha et al. | 715/769 |
| 8,456,488 B2* | 6/2013 | Ubillos et al. | 345/619 |
| 2001/0017622 A1* | 8/2001 | Patel et al. | 345/418 |
| 2002/0015042 A1* | 2/2002 | Robotham et al. | 345/581 |
| 2002/0091728 A1* | 7/2002 | Kjaer et al. | 707/503 |
| 2002/0105525 A1* | 8/2002 | Abler | 345/566 |
| 2002/0163512 A1* | 11/2002 | Staudacher | 345/204 |
| 2003/0090504 A1* | 5/2003 | Brook et al. | 345/716 |
| 2004/0143590 A1* | 7/2004 | Wong et al. | 707/102 |
| 2004/0143598 A1* | 7/2004 | Drucker et al. | 707/104.1 |
| 2005/0091596 A1* | 4/2005 | Anthony et al. | 715/712 |
| 2005/0125739 A1* | 6/2005 | Thompson et al. | 715/778 |
| 2005/0134578 A1* | 6/2005 | Chambers et al. | 345/184 |
| 2005/0144571 A1* | 6/2005 | Loverin et al. | 715/822 |
| 2005/0188326 A1* | 8/2005 | Ikeda | 715/788 |
| 2005/0192924 A1* | 9/2005 | Drucker et al. | 707/1 |
| 2005/0195216 A1* | 9/2005 | Kramer et al. | 345/619 |
| 2005/0223340 A1* | 10/2005 | Repka | 715/851 |
| 2006/0026523 A1* | 2/2006 | Kitamaru et al. | 715/708 |
| 2006/0059432 A1* | 3/2006 | Bells | 715/768 |
| 2006/0059437 A1* | 3/2006 | Conklin, III | 715/800 |
| 2006/0176403 A1 | 8/2006 | Gritton et al. | |
| 2006/0230056 A1* | 10/2006 | Aaltonen | 707/102 |
| 2006/0236362 A1* | 10/2006 | Istvan et al. | 725/135 |
| 2007/0033544 A1* | 2/2007 | Fleisher et al. | 715/800 |
| 2007/0038955 A1* | 2/2007 | Nguyen | 715/804 |
| 2007/0055940 A1* | 3/2007 | Moore et al. | 715/738 |
| 2007/0079246 A1* | 4/2007 | Morillon et al. | 715/741 |
| 2007/0083911 A1* | 4/2007 | Madden et al. | 725/135 |
| 2007/0136685 A1 | 6/2007 | Bhatla et al. | |
| 2007/0192739 A1 | 8/2007 | Hunleth et al. | |
| 2007/0199022 A1 | 8/2007 | Moshiri et al. | |
| 2007/0229706 A1 | 10/2007 | Watanabe et al. | |
| 2007/0253025 A1* | 11/2007 | Terayoko | 358/1.16 |
| 2008/0016468 A1* | 1/2008 | Chambers et al. | 715/835 |
| 2008/0062141 A1* | 3/2008 | Chandhri | 345/173 |
| 2008/0082938 A1* | 4/2008 | Buczek | 715/784 |
| 2008/0104091 A1* | 5/2008 | Chin | 707/100 |
| 2008/0147664 A1* | 6/2008 | Fujiwara et al. | 707/7 |
| 2008/0150892 A1* | 6/2008 | Duhig et al. | 345/156 |
| 2008/0155458 A1* | 6/2008 | Fagans et al. | 715/781 |
| 2008/0155473 A1* | 6/2008 | Duhig | 715/818 |
| 2008/0155474 A1* | 6/2008 | Duhig | 715/830 |
| 2008/0155475 A1* | 6/2008 | Duhig | 715/830 |
| 2008/0225153 A1* | 9/2008 | Fagans | 348/333.01 |
| 2008/0235735 A1 | 9/2008 | Wroblewski | |
| 2008/0307303 A1* | 12/2008 | Louch et al. | 715/273 |
| 2009/0007014 A1* | 1/2009 | Coomer et al. | 715/830 |
| 2009/0040240 A1* | 2/2009 | Grotjohn et al. | 345/689 |
| 2009/0087037 A1* | 4/2009 | Wada | 382/118 |
| 2009/0100373 A1* | 4/2009 | Pixley et al. | 715/786 |
| 2009/0150775 A1* | 6/2009 | Miyazaki et al. | 715/702 |
| 2009/0164944 A1* | 6/2009 | Webster et al. | 715/838 |
| 2009/0204920 A1* | 8/2009 | Beverley et al. | 715/768 |
| 2009/0210819 A1* | 8/2009 | Fujimoto et al. | 715/784 |
| 2009/0222765 A1* | 9/2009 | Ekstrand | 715/818 |
| 2009/0244003 A1* | 10/2009 | Bonnat | 345/157 |
| 2009/0271108 A1* | 10/2009 | Glaser-Seidnitzer et al. | 715/821 |
| 2010/0045702 A1* | 2/2010 | Doyle et al. | 345/641 |
| 2010/0083082 A1* | 4/2010 | Lehrian et al. | 715/212 |
| 2010/0095238 A1* | 4/2010 | Baudet | 715/784 |
| 2010/0107116 A1* | 4/2010 | Rieman et al. | 715/784 |
| 2010/0180222 A1* | 7/2010 | Otsuka et al. | 715/768 |
| 2011/0099501 A1* | 4/2011 | Mull et al. | 715/771 |
| 2011/0145757 A1* | 6/2011 | Janwari | 715/786 |
| 2013/0007656 A1* | 1/2013 | Li et al. | 715/790 |

FOREIGN PATENT DOCUMENTS

| | | |
|---|---|---|
| JP | 2007036966 A | 2/2007 |
| JP | 2007334594 A | 12/2007 |
| JP | 2008-527539 T | 7/2008 |
| JP | 2008-527540 T | 7/2008 |

OTHER PUBLICATIONS

Communication pursuant to Article 94 (3) EPC, from EP Application No. 09181047.3, dated Feb. 26, 2013.

Office Action from Japanese Application No. 2009-003974, dated Nov. 6, 2012.

* cited by examiner

DISPLAY DEVICE AND DISPLAY METHOD

CROSS-REFERENCE TO RELATED APPLICATION

The present application claims priority from Japanese Patent Application No. JP 2009-003974 filed in the Japanese Patent Office on Jan. 9, 2009, the entire content of which is incorporated herein by reference.

BACKGROUND OF THE INVENTION

1. Field of the Invention

The present invention relates to a display device and a display method.

2. Description of the Related Art

With respect to a screen displayed on a display and the like, layout structures for user interfaces are known as described in the Published Japanese Translation of PCT Application No. 2008-527539. Further, technology that zooms an image in accordance with selection is known as described in the Published Japanese Translation of PCT Application No. 2008-527540.

SUMMARY OF THE INVENTION

However, for example, with a screen on which a plurality of contents corresponding to broadcast waves are displayed, if the screen is scrolled while a desired content is being viewed in order to view another content, the desired content is also scrolled. As a result of the scrolling, it becomes difficult to recognize the desired content.

In light of the foregoing, it is desirable to provide a novel and improved display device and display method that are capable of constantly recognizing a selected screen region even when the screen is scrolled.

According to an embodiment of the present invention, there is provided, a display device includes an operation input portion from which operation information is input by a user, a selection portion that selects a predetermined region on a display screen based on the operation information, and a scroll portion that scrolls the display screen in a state where a position of the selected predetermined region is held at a predetermined position.

With the above-described structure, a predetermined region on the display screen is selected based on the operation information input by the user, and the display screen is scrolled in a state where the position of the selected predetermined region is held at a predetermined position. Therefore, even when the screen is scrolled, the selected predetermined region is not scrolled, and the user can reliably confirm the selected screen region.

In this configuration, a plurality of contents obtained from broadcast signals are displayed on the display screen, and the selection portion selects at least one of the plurality of contents.

In this configuration, a browser screen of a communication network is displayed on the display screen, and the selection portion cuts out and selects a predetermined region on the browser screen based on the operation information.

In this configuration, the predetermined region selected by the selection portion is moved to the predetermined position, and at least a part of the predetermined region is superimposed on a non-selected region and displayed.

In this configuration, the display device further includes a transparency processing portion that applies transparency processing to the selected predetermined region after a predetermined time period has elapsed.

In this configuration, the display device further includes an enlargement portion that enlarges the predetermined region. When a plurality of the predetermined regions are selected, the enlargement portion enlarges the plurality of the predetermined regions to have the same size.

In this configuration, the display device further includes an enlargement portion that enlarges the predetermined region; and a weighting processing portion that performs weighting processing of the predetermined region, based on one of meta-information of content and user's preference information. When a plurality of the predetermined regions are selected, the enlargement portion enlarges the selected predetermined regions in accordance with a result of the weighting processing.

In this configuration, the display device further includes a weighting processing portion that performs weighting processing of the predetermined region, based on one of meta-information of content and user's preference information. The predetermined region is moved to the predetermined position in accordance with a result of the weighting processing.

According to another embodiment of the present invention, there is provided a display method, includes the steps of inputting operation information by a user, selecting a predetermined region on a display screen based on the operation information, and scrolling the display screen such that the selected predetermined region does not follow the scroll.

With the above-described method, a predetermined region on the display screen is selected based on the operation information input by the user, and the display screen is scrolled in a state where the position of the selected predetermined region is held at a predetermined position. Therefore, even when the screen is scrolled, the selected predetermined region is not scrolled, and the user can reliably confirm the selected screen region.

In this configuration, a plurality of contents obtained from broadcast signals are displayed on the display screen, and at least one of the plurality of contents is selected in the selecting step.

In this configuration, a browser screen of a communication network is displayed on the display screen, and a predetermined region on the browser screen is cut out and selected based on the operation information in the selecting step.

According to the present invention, it is possible to constantly recognize a selected screen region even when the screen is scrolled.

DETAILED DESCRIPTION OF THE EMBODIMENT(S)

Figure 1:
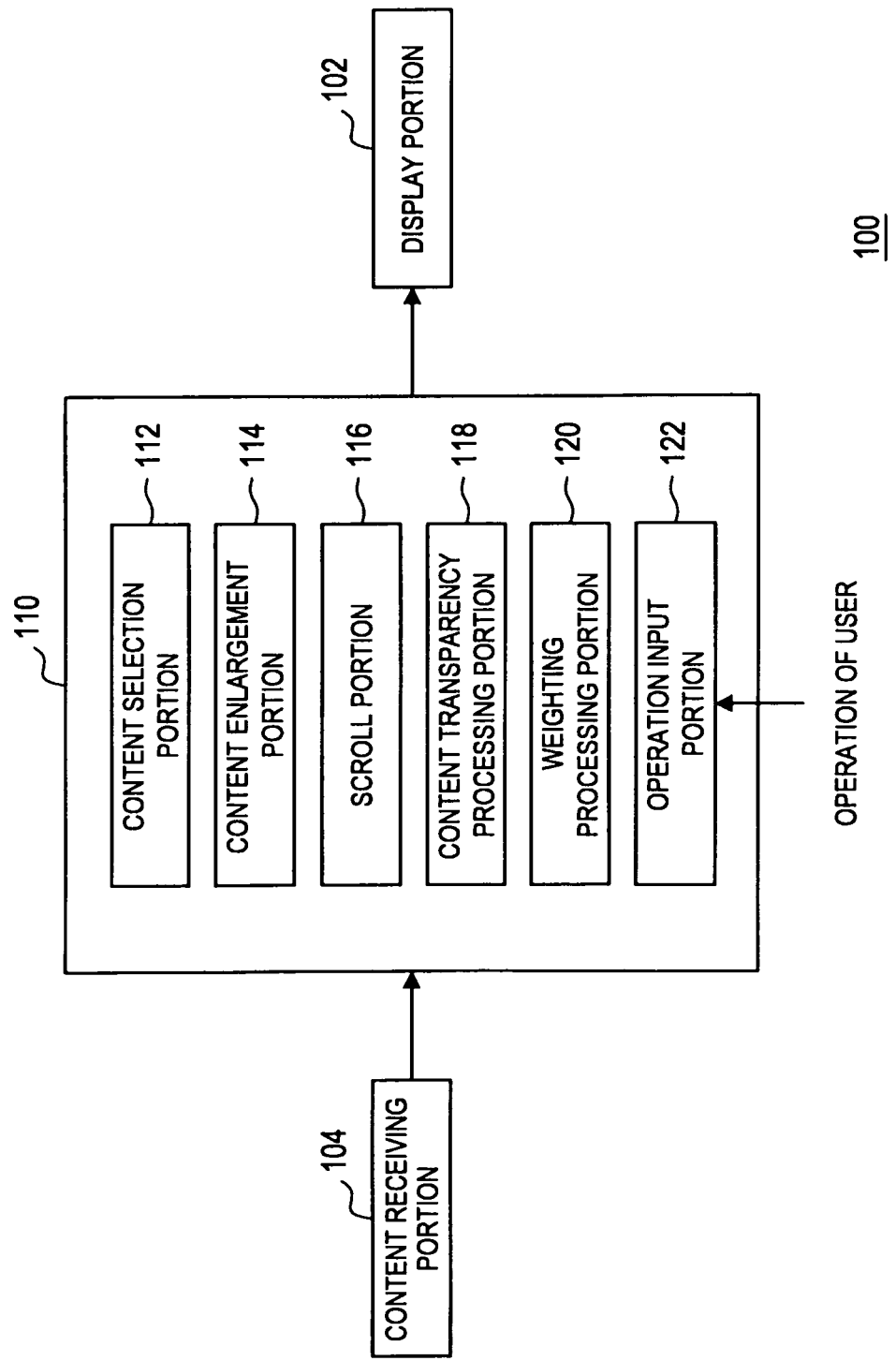
FIG. 1 is a functional block diagram showing the structure of a display device according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. Note that an explanation will be made in the following order.

1. Structure of a display device according to an embodiment of the present invention
2. Example of contents displayed by the display device
3. Content selection and scrolling
4. Transparency display of selected content
5. Enlargement of content
6. Each processing flow when using the display device
7. Screen region selection on a browser screen 1. Structure of a Display Device According to an Embodiment of the Present Invention FIG. 1 is a functional block diagram showing the structure of a display device 100 according to an embodiment of the present invention. The display device 100 is a device such as a television receiver, for example. The display device 100 receives broadcast signals such as digital terrestrial broadcast signals, and displays video of a television program etc. based on video signals obtained from the broadcast signals. The display device 100 includes a display portion 102 such as a liquid crystal panel, a content receiving portion 104 that receives program content from broadcast signals, and a display control portion 110 into which the received content is input and which performs control to display the content on the display portion 102. In addition, the display device 100 includes constituent elements (not shown in the figures), such as an antenna that receives broadcast waves, a tuner, and a DEMUX that separates video data (video signals) and audio data (audio signals) from the broadcast signals.

The content receiving portion 104 receives, from the video signals received from the broadcast signals, video content supplied by each broadcast station. Information of the content is input to the display control portion 110. The display control portion 110 includes a content selection portion 112, a content enlargement portion 114, a scroll portion 116, a content transparency processing portion 118, a weighting processing portion 120, and an operation input portion 122. Operation information of the user is input to the operation input portion 122 from various type of switches provided on the display device 100, and a remote control or a pointing device (a mouse or the like) that is connected to the display device 100.

The display device 100 can receive broadcast signals from a plurality of broadcast stations, and can display on the display portion 102 program video content of one of the broadcast stations that is selected by the user. Further, the display device 100 can receive broadcast signals from a plurality of broadcast stations, and can display, at the same time on a single screen, program videos received from the plurality of broadcast stations as contents of thumbnail images.

2. Example of Contents Displayed by the Display Device

Figure 2:
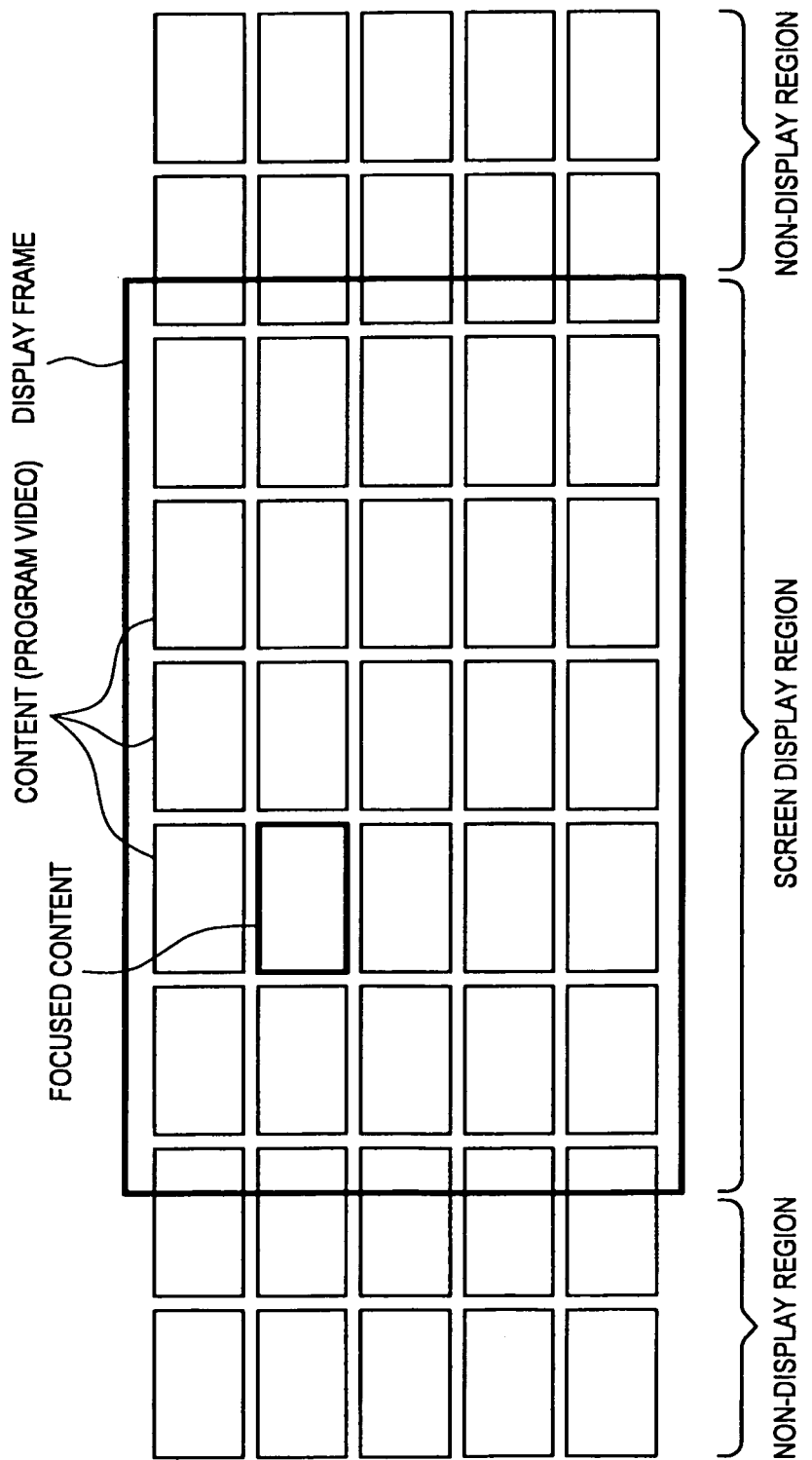
FIG. 2 is a schematic diagram showing a state in which contents are displayed as thumbnail images on a display portion of the display device, the contents being program videos received from a plurality of broadcast stations.

FIG. 2 shows a state in which contents are displayed as thumbnail images on the display portion 102 of the display device 100, the contents being program videos received from a plurality of broadcast stations. A display frame shown in FIG. 2 indicates an image display range (a screen display region) of a display screen of the display portion 102. As shown in FIG. 2, the plurality of received contents are displayed within the display frame of the display portion 102. One content that is surrounded by a thick frame in FIG. 2 shows the content to which the focus is set. The user can move the focus to another content by operating the remote control, the mouse or the like. Content selection to be described later is executed by performing a selection operation in a state where the focus is set to a desired content.

When there are a large number of broadcast stations, contents of the respective broadcast stations are arranged in a broader range than the screen display region. Therefore, by scrolling the contents displayed within the screen display region, the user can move contents located outside of the screen display region to be within the screen display region and look at them. When scrolling is performed, while the cursor (the focus) is set to the content located at an end within the display frame, the cursor is further moved to the outside. Thus, the contents located outside of the display frame enter into the display frame, and the contents are displayed within the screen display region.

3. Content Selection and Scrolling

Figure 3:
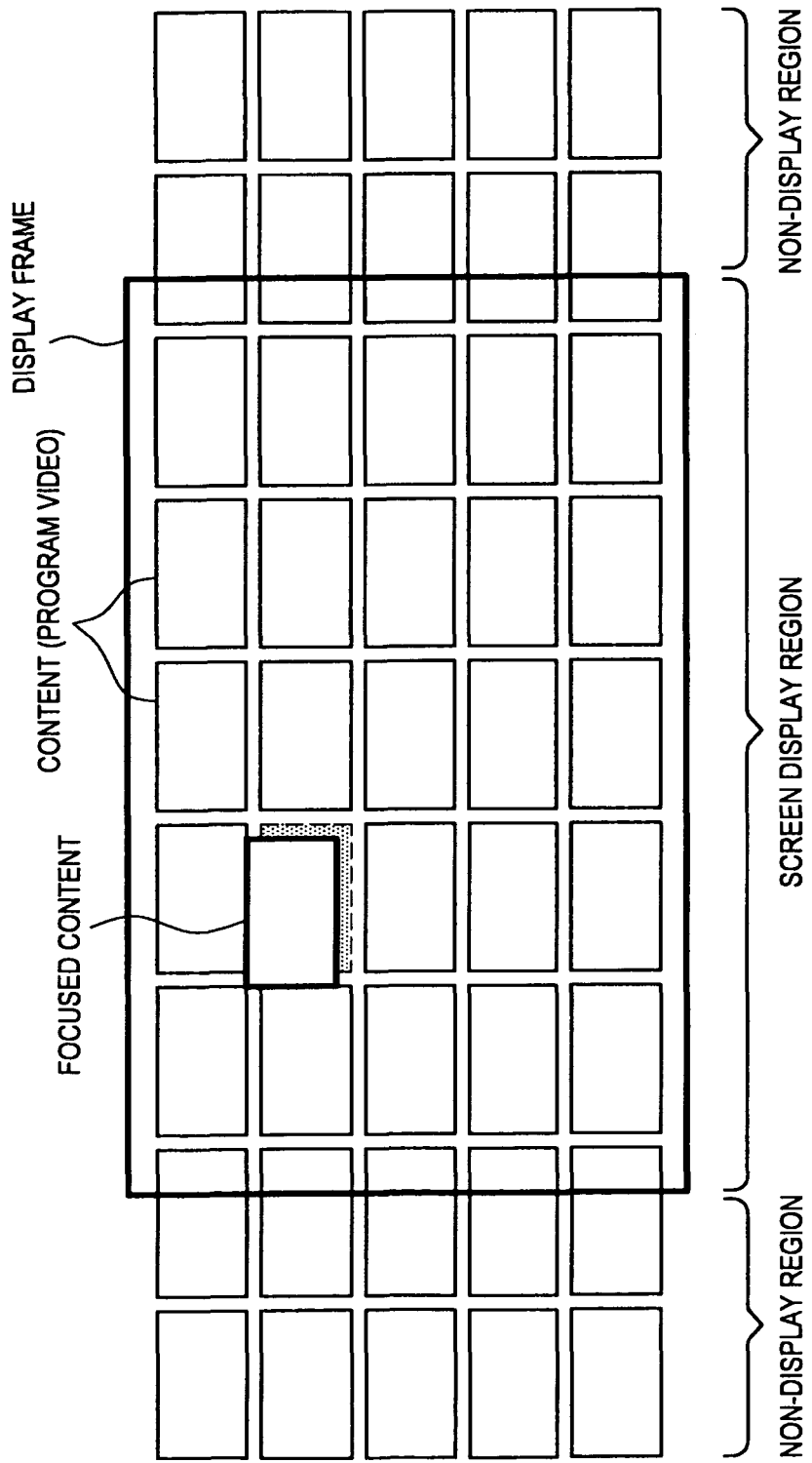
FIG. 3 is a schematic diagram showing a state in which a user has selected one of the contents from the state shown in FIG. 2.

FIG. 3 shows a state in which the user has selected one of the contents from the state shown in FIG. 2. The content selection is performed such that the content selection portion 112 of the display control portion 110 selects one of the contents according to operation information input by the user. More specifically, the user can set the focus to one of the contents shown in FIG. 2 by operating the remote control, the mouse or the like, and the outline of the content to which the focus is set is displayed with a thick frame. When the user clicks the content while the focus is set thereto, the content is selected. With the display device 100 according to the present embodiment, when the user selects one of the contents, the position of the selected content is moved by a predetermined amount in an upper left direction. In a region where the selected content and non-selected content overlap each other, the selected content is displayed. Thus, the selected content is displayed in a floating state with respect to the non-selected content.

Figure 4:
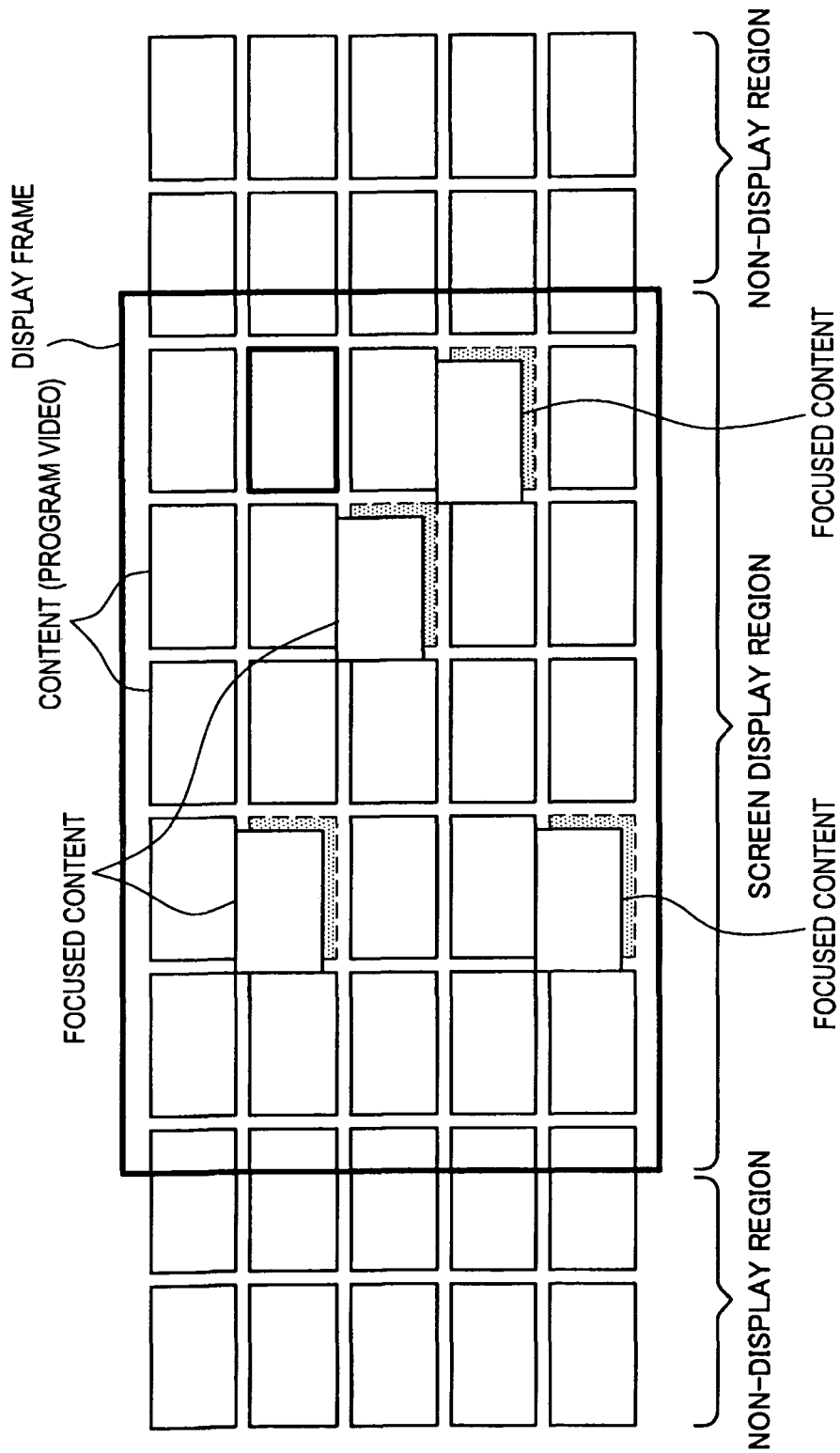
FIG. 4 is a schematic diagram showing a state in which the user has selected a plurality of the contents.

FIG. 4 shows a state in which the user has selected a plurality of contents. When the plurality of contents are selected as shown in FIG. 4, all the selected contents are displayed in a floating state. Accordingly, because the selected contents are displayed in a floating state, the user can easily distinguish and recognize the selected contents and non-selected contents.

Figure 5:
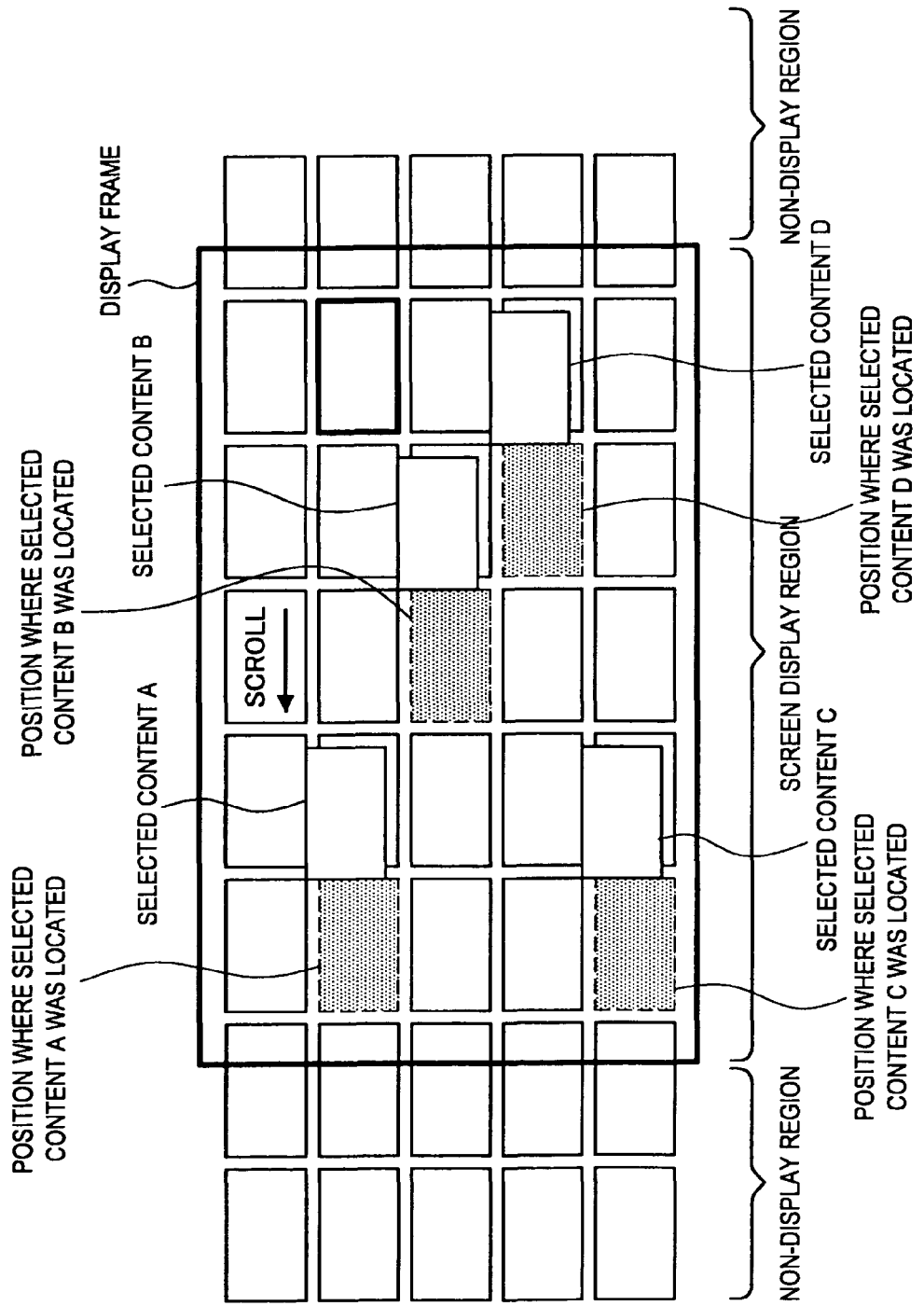
FIG. 5 is a schematic diagram showing a state in which the user has scrolled the screen from the state shown in FIG. 4.

With the display device 100 according to the present embodiment, if the content selection is performed as shown in FIG. 3 or FIG. 4, when the user scrolls the screen, the selected content remains in that position and only the non-selected contents are scrolled. FIG. 5 shows a state in which the user has scrolled the screen from the state shown in FIG. 4. The scrolling of the screen is performed by the scroll portion 116 of the display control portion 110 scrolling the display screen according to operation information input by the user.

As shown in FIG. 5, even if the screen is scrolled, the selected contents A, B, C and D remain in the same positions without moving. On the other hand, the non-selected contents are scrolled in the arrow direction shown in FIG. 5 in accordance with an operation of the user. Accordingly, the selected contents do not move to the outside of the screen display region, and the user can look at other contents in a state where the user can constantly recognize the selected contents. In addition, the user can select content that newly appears in the screen display region due to the scrolling.

As shown in FIG. 5, the positions in which the contents A, B, C and D have been located are scrolled in a blank state, because the contents A, B, C and D remain at their positions without moving. Here, the blank positions may be used to newly display program video content of another broadcast station.

Figure 6:
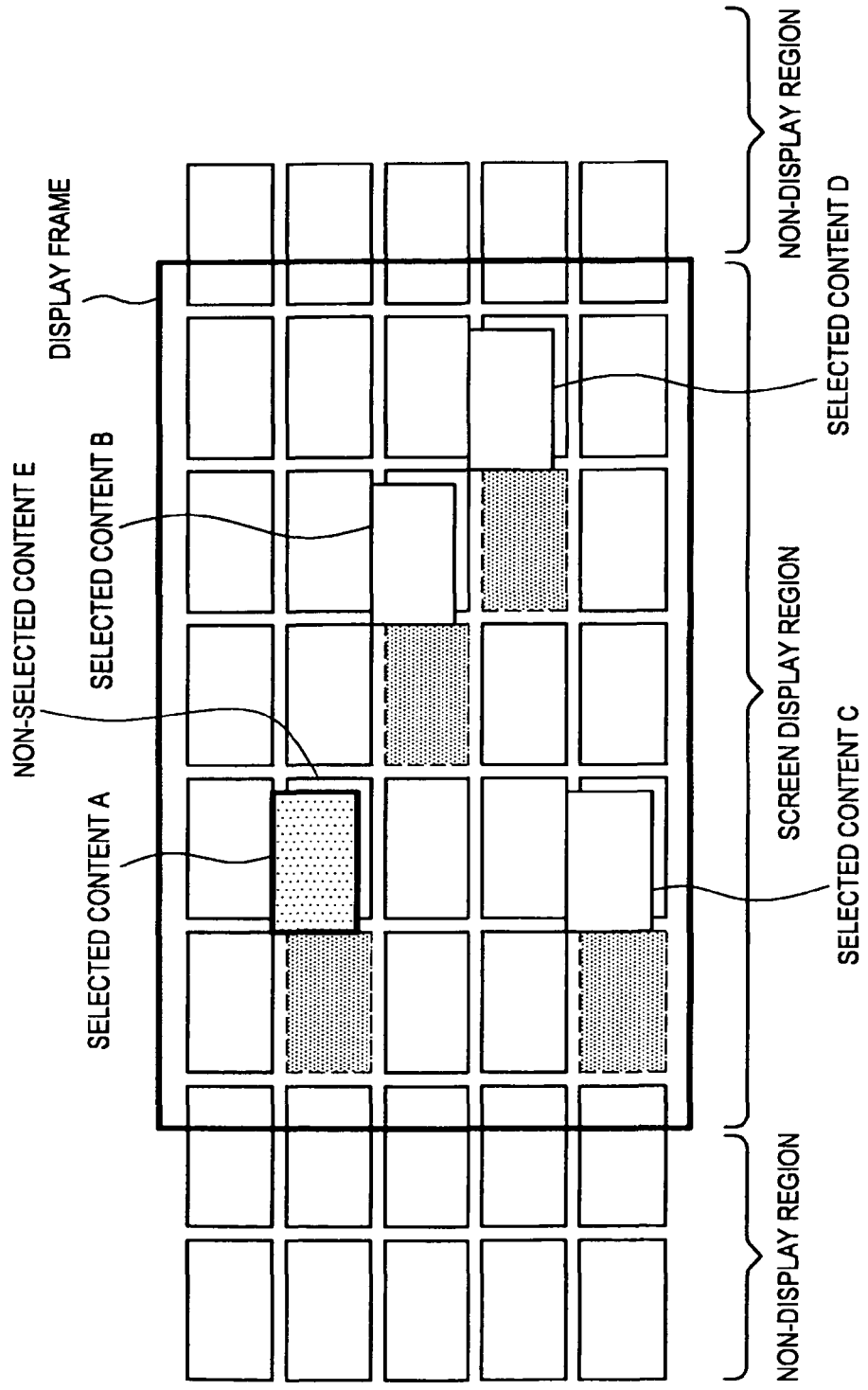
FIG. 6 is a schematic diagram showing a state in which the scroll is stopped in the state shown in FIG. 5, and focus is moved to the position of a content A to set the focus to the content A.

FIG. 6 shows a state in which the scroll is stopped in the state shown in FIG. 5, and the focus is moved to the position of the content A to set the focus to the content A. As a result, the outline of the content A is displayed with a thick frame, thereby indicating that the focus is set to the content A. If the focus is set to the selected content in this manner and the content is then clicked, zooming (to be described later) is performed.

4. Transparency Display of Selected Content

If another content slides in behind the selected content (the content A) as shown in FIG. 6, it is possible to set the focus to the selected content. In the present embodiment, if a predetermined time period has elapsed after the content is selected, the selected content becomes a state of transparency (transparent or semi-transparent). Thus, it is possible to set the focus to the content located behind the transparent or semi-transparent content and select it.

Figure 7:
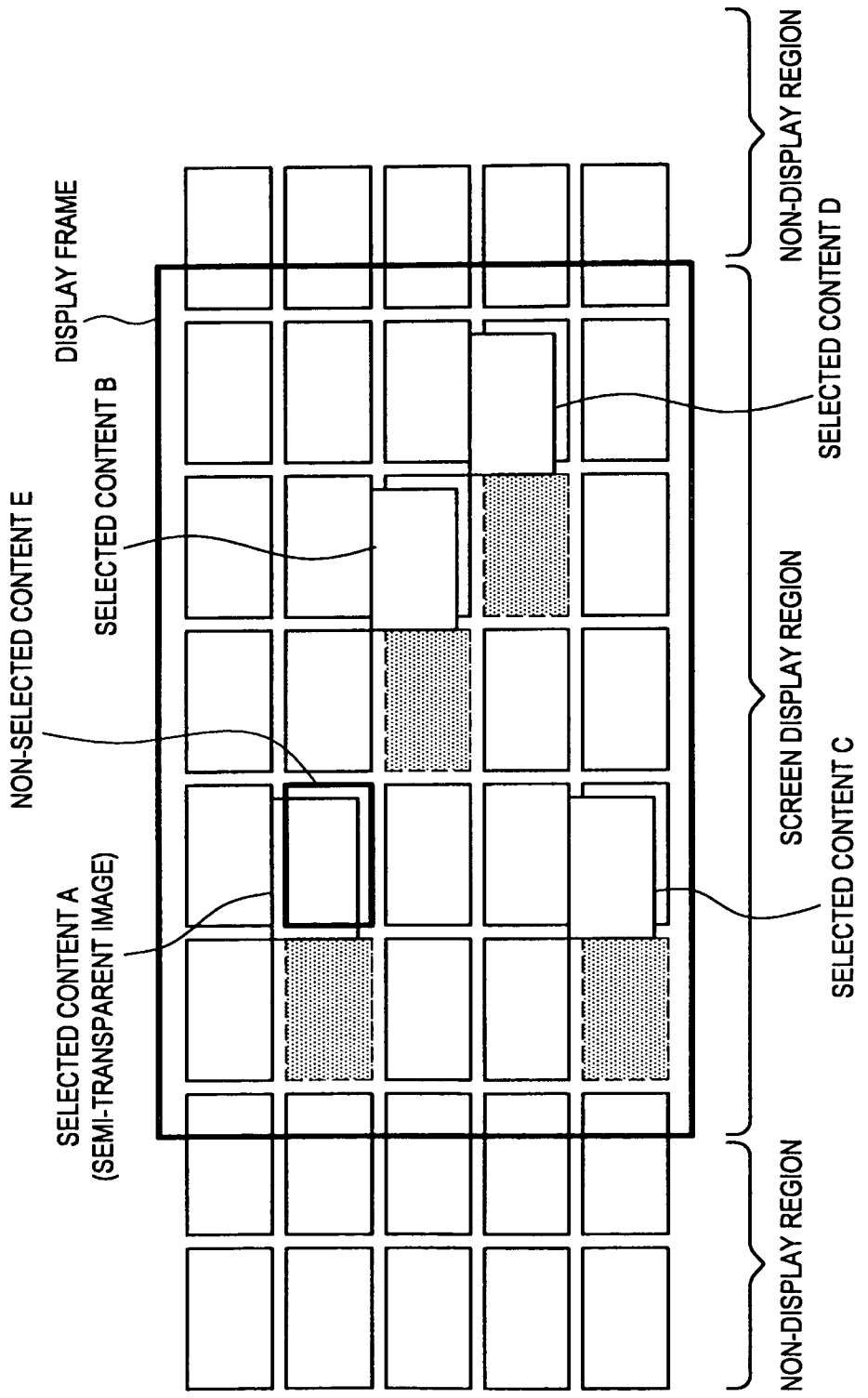
FIG. 7 is a schematic diagram showing a state in which a predetermined time period has elapsed from the state shown in FIG. 6.

FIG. 7 shows a state in which a predetermined time period has elapsed from the state shown in FIG. 6. In the example shown in FIG. 7, the predetermined time period has elapsed after the content A is selected, and the content A is thereby displayed as a semi-transparent image. Processing to make content semi-transparent (or transparent) is performed by the content transparency processing portion 118 of the display control portion 110 when the predetermined time period has elapsed after the selection. As the selected content becomes semi-transparent in this manner, the user can look at a non-selected content E located behind the semi-transparent content. Accordingly, when the screen is scrolled without changing the position of the selected content, even if the selected content and the content behind the selected content overlap with each other, the user can look at the content behind the selected content.

Figure 8:
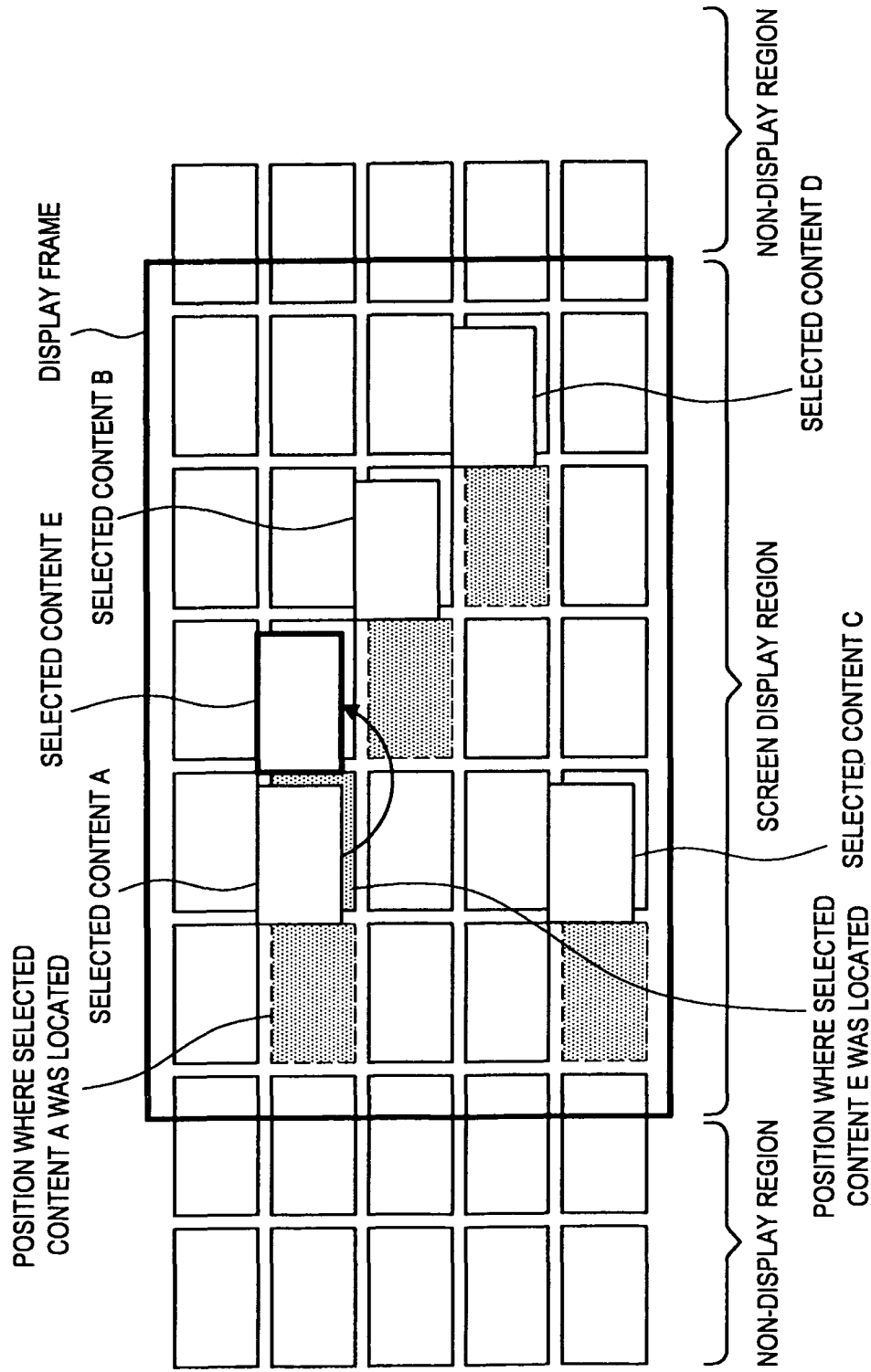
FIG. 8 is a schematic diagram showing a state in which a content E is selected, the content E being located behind the content A that has been selected in the state shown in FIG. 6 or FIG. 7.

FIG. 8 shows a state in which the content E is selected, the content E being located behind the content A that has been selected in the state shown in FIG. 6 or FIG. 7. In the state shown in FIG. 6 or FIG. 7, the position of the content E and the position of the selected content A overlap with each other. Therefore, if the content E is selected, the selected content E is arranged in a position in which it does not overlap with the selected content A, as shown in FIG. 8. In the example shown in FIG. 8, the selected content E is displayed further to the right side of the selected content A. In this manner, when content is newly selected, the newly selected content moves in a direction in which scrolling can be performed, so as not to interfere with the floating content that has already been selected. As a result, it is possible to suppress interference between the newly selected content and the already selected content.

5. Enlargement of Content

Figure 9:
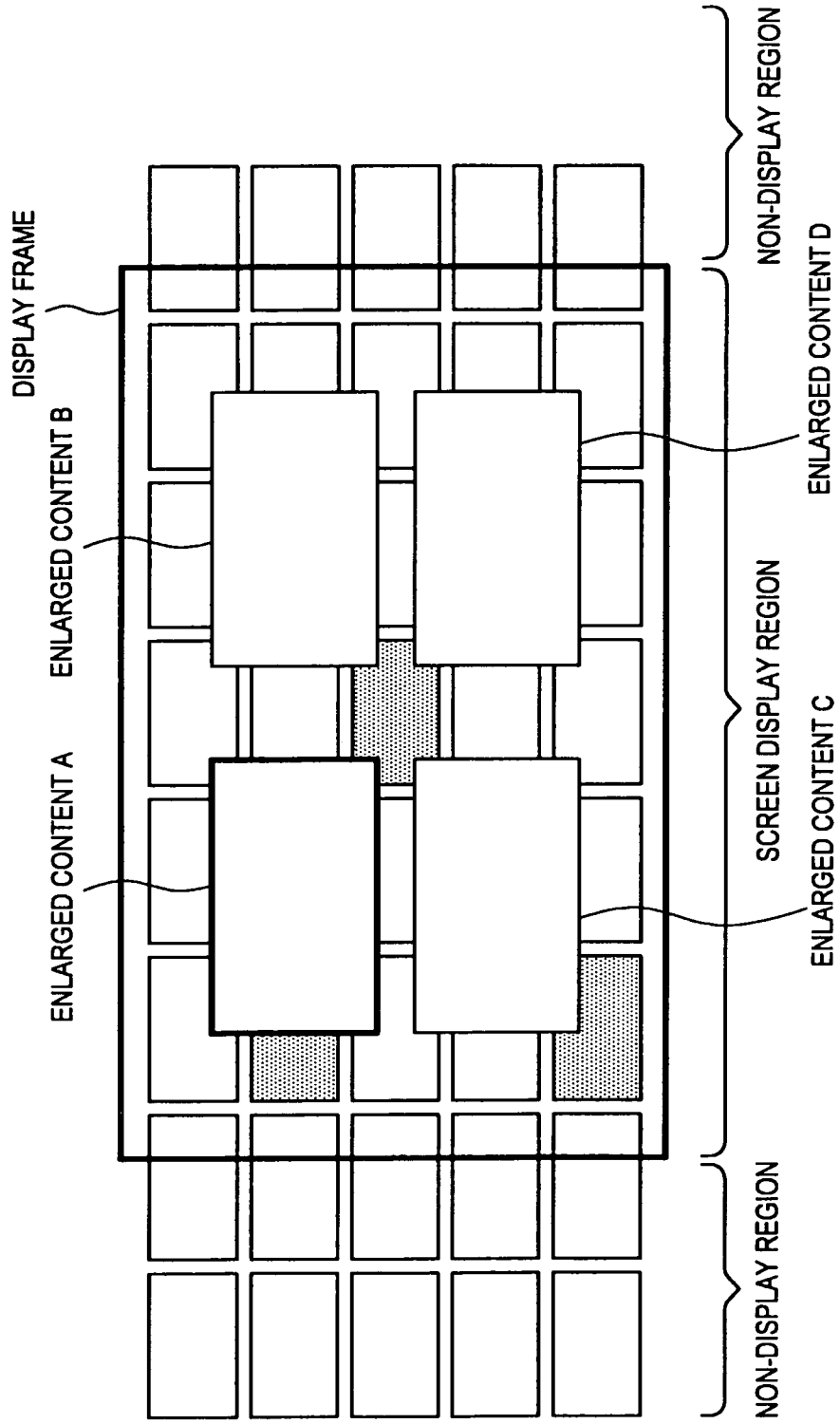
FIG. 9 is a schematic diagram showing a state in which one of the selected contents A, B, C and D shown in FIG. 6 is clicked and zooming is performed.

Next, zooming (enlargement) of the selected content will be described. With the display device 100 according to the present embodiment, all the selected contents can be enlarged and displayed by moving the cursor to the position of one of the selected contents and clicking it. FIG. 9 shows a state in which one of the selected contents A, B, C and D shown in FIG. 6 is clicked and zooming is performed. As shown in FIG. 9, if one of the selected contents A, B, C and D is clicked, all the selected contents A, B, C and D are enlarged. At this time, the plurality of selected contents are zoomed up evenly at the same enlargement ratio, and the respective contents are enlarged to have the same size. Further, the respective contents are evenly arranged in the screen display region so that there is no bias in the arrangement.

Figure 10:
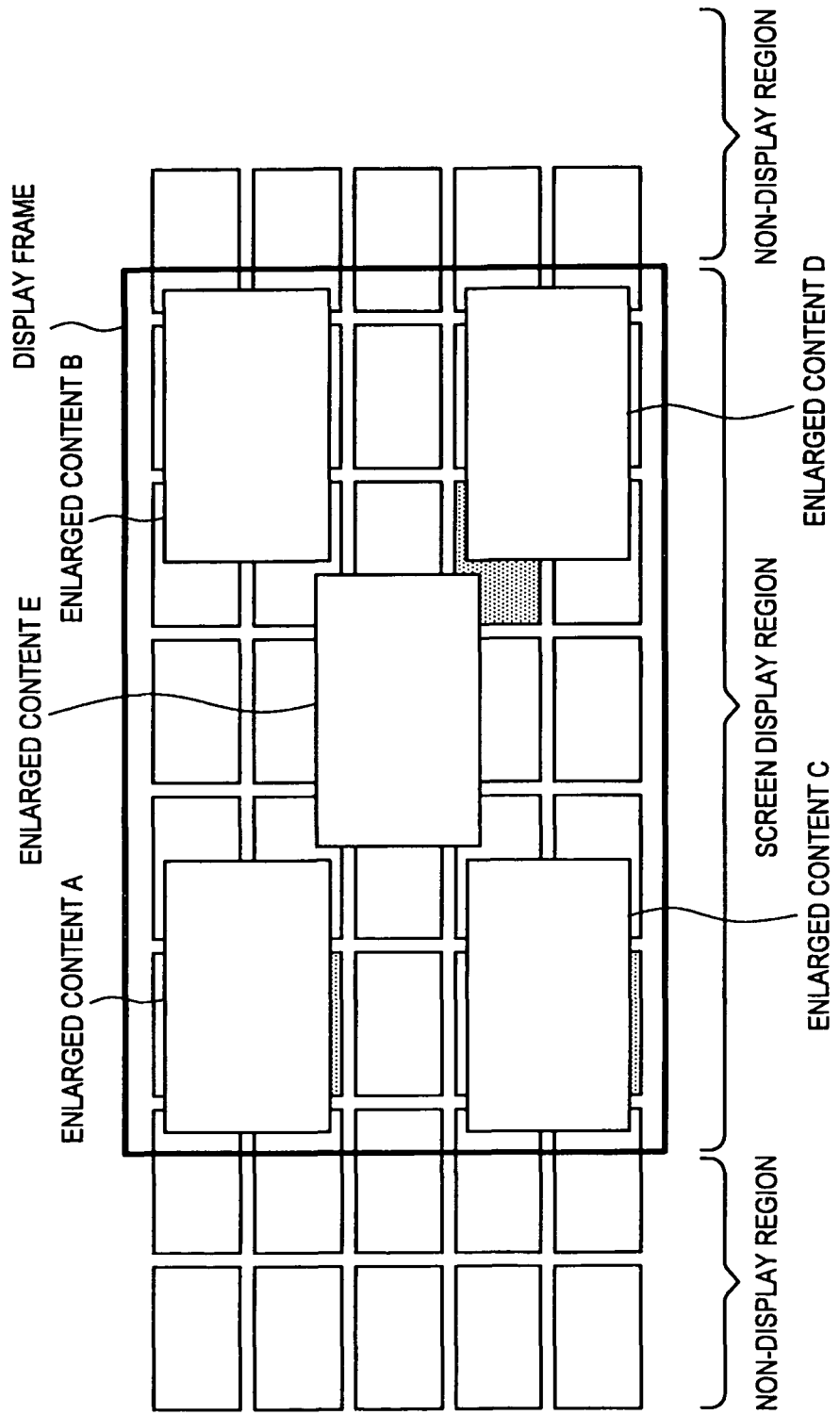
FIG. 10 is a schematic diagram showing a state in which zooming is performed when the number of the selected contents is five.

FIG. 9 shows a state in which zooming is performed when the number of the selected contents is four. FIG. 10 shows a state in which zooming is performed when the number of the selected contents is five (in the case of FIG. 8, for example). As shown in FIG. 10, when the number of the selected contents is five, the enlargement ratio becomes smaller as compared to the case shown in FIG. 8. Further, the enlarged contents are evenly arranged in the screen display region. In the state shown in FIG. 9 or FIG. 10, the cursor is set only to the plurality of contents that have been zoomed up.

Figure 11:
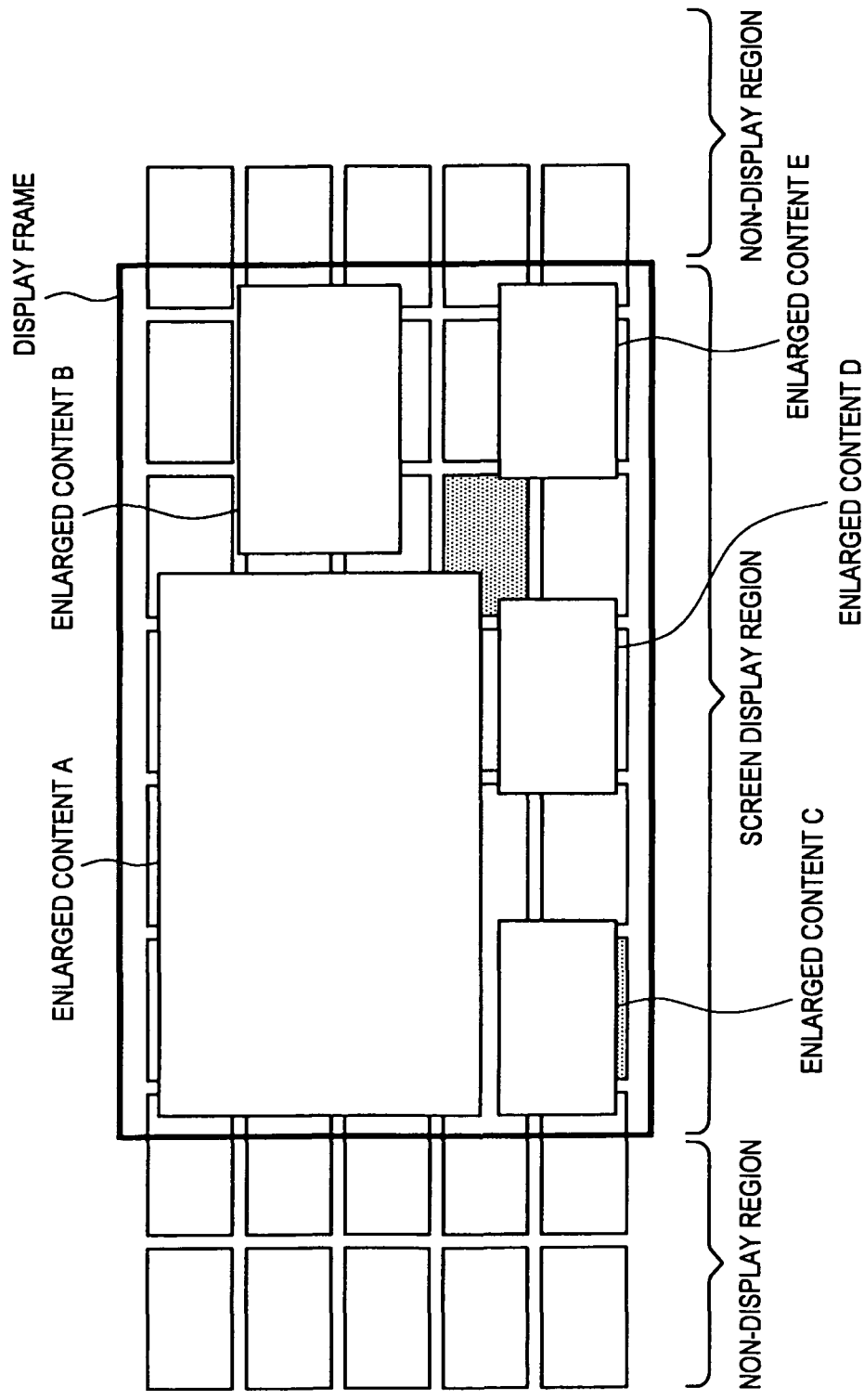
FIG. 11 is a schematic diagram showing a case in which enlargement ratios of the selected contents are changed, and weighting of the zooming is performed.

FIG. 11 shows a state in which enlargement ratios of the selected contents are changed, and weighting of the zooming is performed. In the example shown in FIG. 11, the enlargement ratio of the content A is set to be larger than that of the other contents, and the content A is displayed in a larger size than the other contents. More specifically, the enlargement ratio of the content A is determined by the weighting processing portion 120 based on meta-information of the content, preference information of the user or the like. For example, based on the meta-information of the content A and the preference information of the user, with regard to a video genre to which the content A belongs, if past viewing frequency of that genre is high, the enlargement ratio of the content A is set to be larger than that of the other contents. Thus, because a desired content of the user is further enlarged and displayed, the user can reliably recognize the desired content.

As shown in FIG. 9, FIG. 10 and FIG. 11, when zooming is performed, it is possible to set the focus only to the zoomed contents. Further, when the zoomed state is restored to the original state, if an operation different from a normal click operation is performed, for example, if a right click button of the mouse is operated, the original state can be restored.

Figure 12:
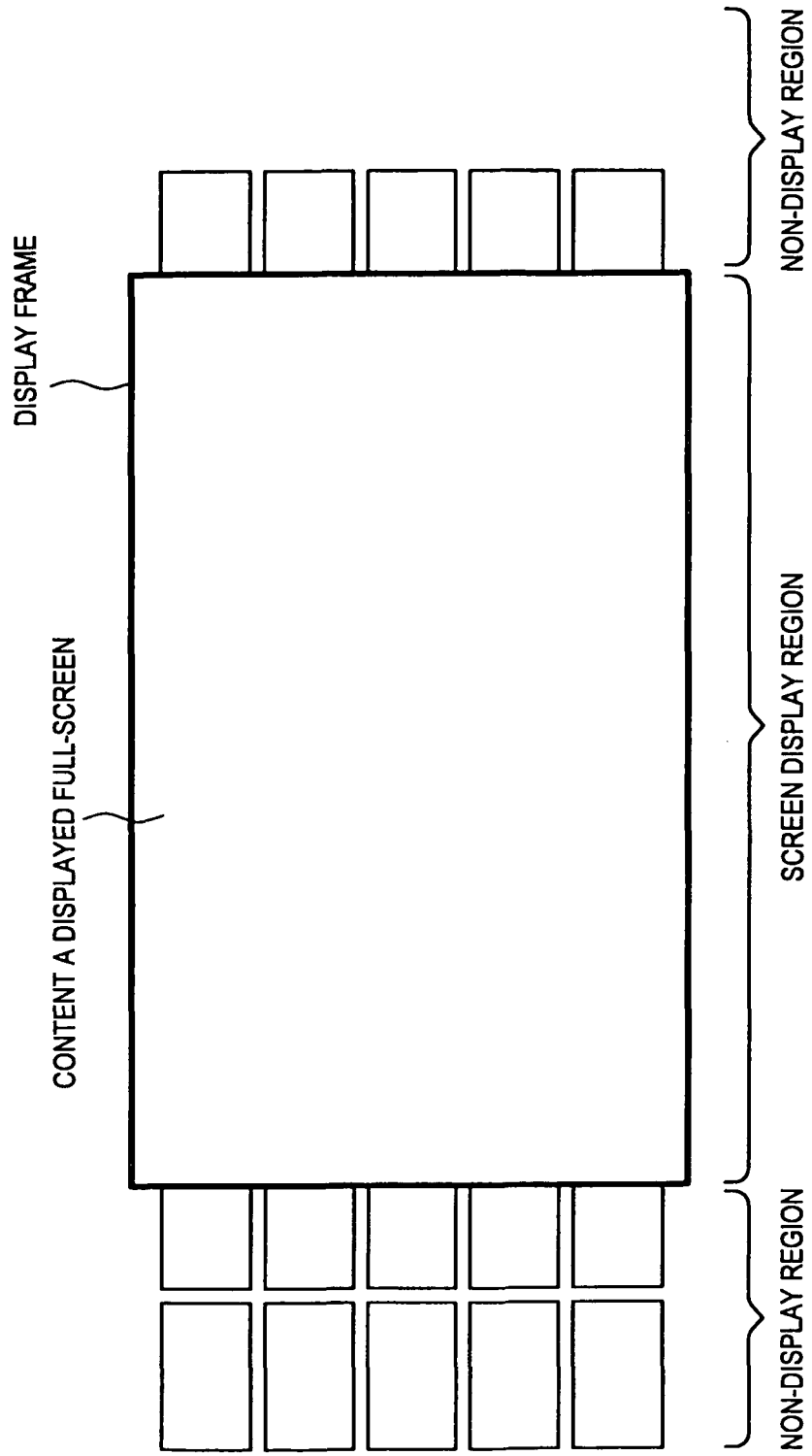
FIG. 12 is a schematic diagram showing a state in which, from the state shown in FIG. 9, FIG. 10 or FIG. 11, a cursor is moved onto one of the zoomed contents so as to set the focus to the content, and the content is then clicked.

FIG. 12 shows a state in which, from the state shown in FIG. 9, FIG. 10 or FIG. 11, the cursor is moved onto one of the zoomed contents so as to set the focus to the content and the content is then clicked. In this case, the clicked content is displayed full-screen within the display frame. Accordingly, after the user has selected a plurality of contents that the user is interested in from the content list, if the user performs zooming and further clicks one of the selected contents, the user can finally display the content that the user is most interested in full-screen.

As described above, according to the present embodiment, if the user selects a desired content from among a plurality of contents and thereafter clicks the selected content, zooming is performed to enlarge and display the content. If the zoomed content is further clicked, it is possible to display the content full-screen. Note that the operation from the content selection to the full-screen display is not limited to this example. For example, by performing a predetermined operation after the content has been selected, shift to the full-screen display may be made without performing a process via the zoomed screen.

Figure 13:
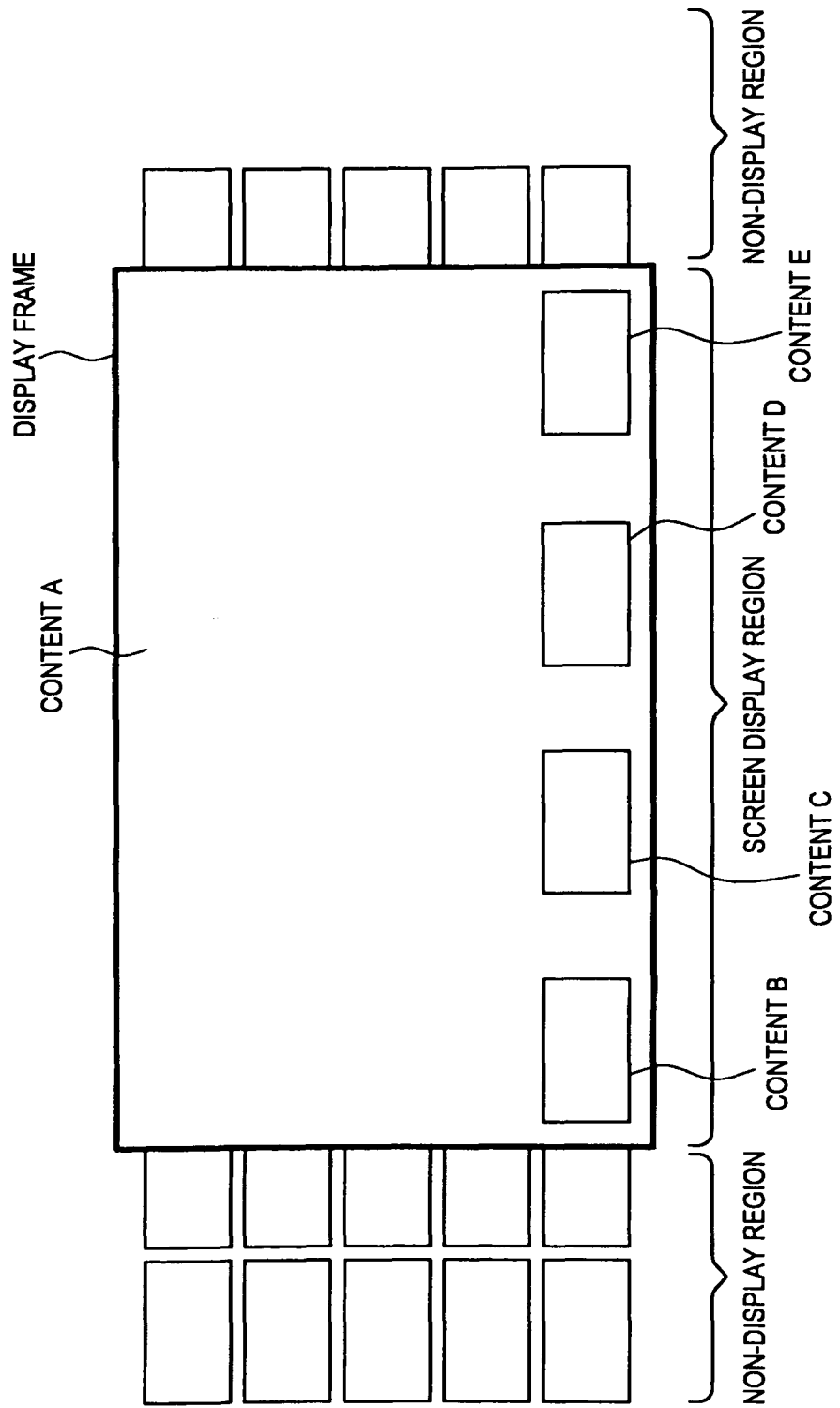
FIG. 13 is a schematic diagram showing an example in which, when the content A is displayed full-screen, the contents B, C, D and E are superimposed and displayed as thumbnail images.

FIG. 13 is a schematic diagram showing an example in which, when the content A is displayed full-screen, the contents B, C, D and E are superimposed and displayed as thumbnail images. In this manner, the other selected contents may be superimposed and displayed as thumbnail images.

Figure 14:
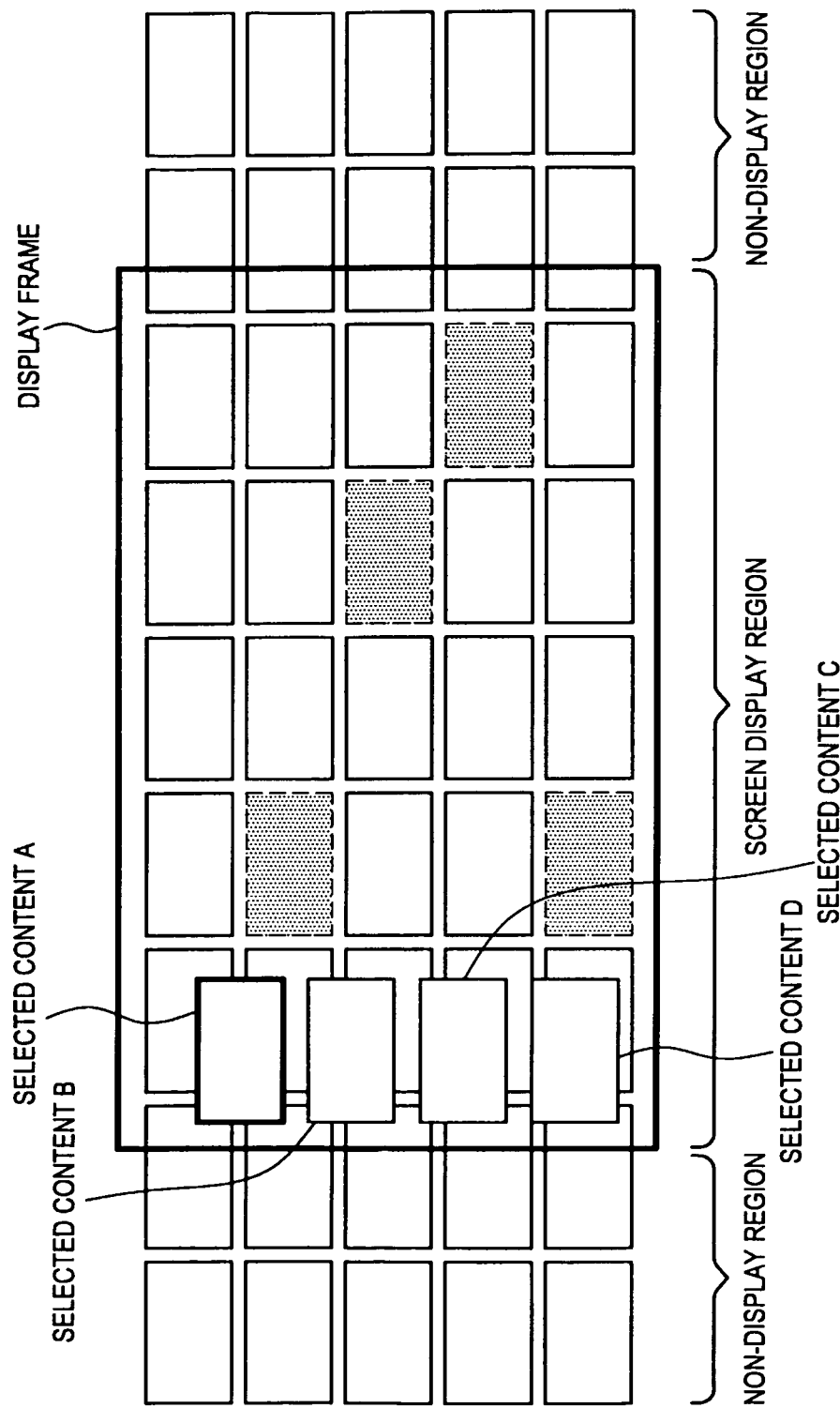
FIG. 14 is a schematic diagram showing an example in which the selected contents A, B, C and D are collectively arranged on the left side of the display frame.

FIG. 14 is a schematic diagram showing an example in which the selected contents A, B, C and D are collectively arranged on the left side of the display frame. In this manner, the selected contents may be collectively arranged in a predetermined region within the display frame. Further, also in the arrangement shown in FIG. 14, the order of arrangement may be determined by the weighting processing portion 120 based on meta-information of the content, preference information of the user or the like, and the contents may be displayed from the top of the display frame in descending order of the user's preference.

6. Each Processing Flow when Using the Display Device

Figure 15:
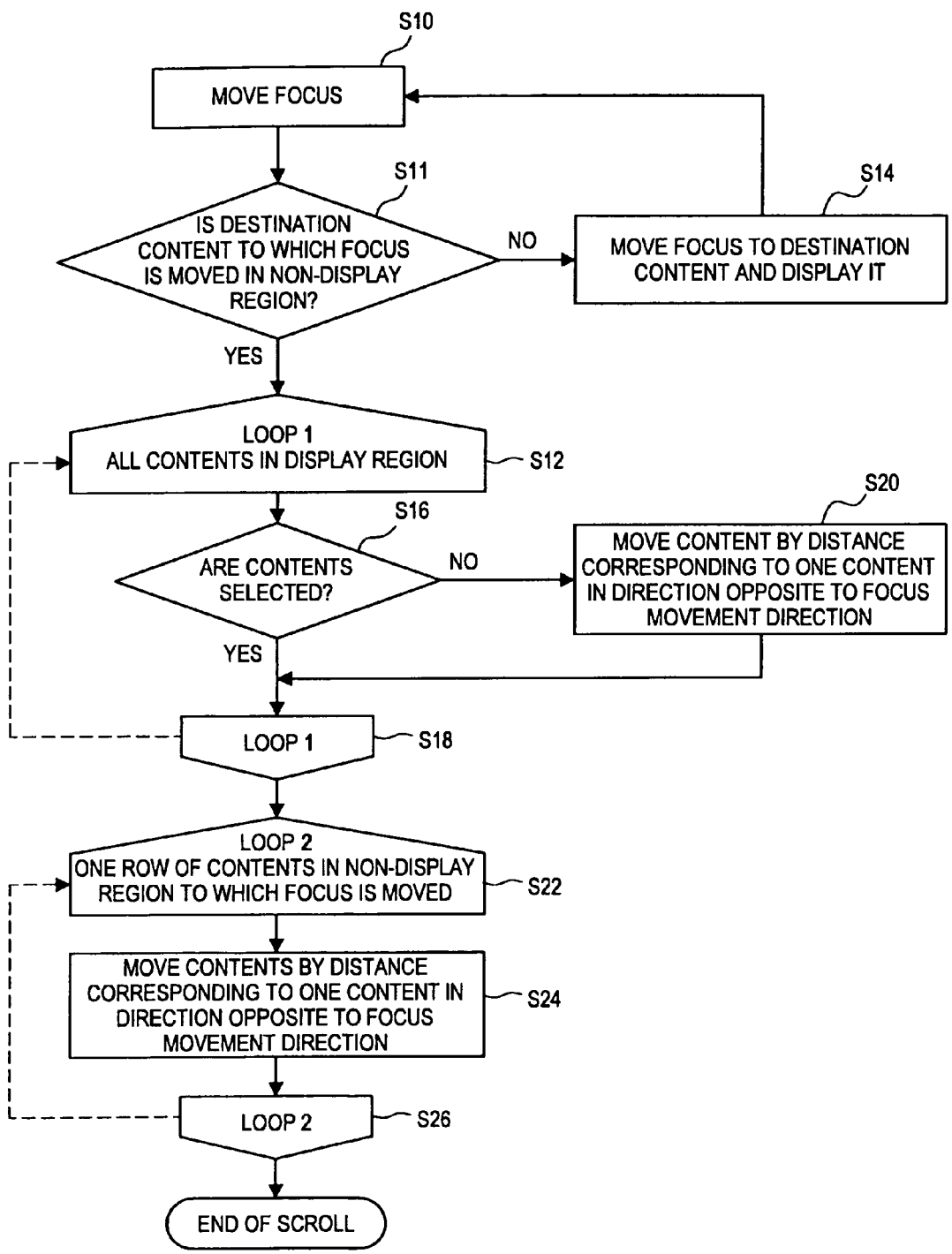
FIG. 15 is a flowchart showing processing when scrolling is performed.

Next, each of the above-described processes when using the display device 100 according to the present embodiment will be described in more detail with reference to FIG. 15 to FIG. 18. FIG. 15 is a flowchart showing processing when scrolling is performed. First, at step S10, the user operates the remote control, the mouse or the like to move the focus. At the next step S11, it is determined whether or not a destination content to which the focus is moved is in a non-display region.

When it is determined that the destination content to which the focus is moved is in the screen display region, in other words, when the focus is moved within the display frame, the process proceeds to step S14, and the focus is moved to the destination content to display it.

On the other hand, when it is determined at step S10 that the destination content to which the focus is moved is in the non-display region, in other words, when the focus is moved to the outside of the display frame, the process proceeds to step S12. In processing at step S12, S16 and S18, by performing loop processing at steps S12, S16 and S18, it is determined, for all the contents in the screen display region, whether or not the contents are selected (step S16). At step S20, non-selected content is moved (scrolled) by a distance corresponding to one content in a direction opposite to the focus movement direction.

After the loop processing at steps S12, S16 and S18, the process proceeds to loop processing at steps S22 to S26. A row of contents in the non-display region to which the focus is moved is specified (step S22), and the row of contents is moved (scrolled) by a distance corresponding to one content in the direction opposite to the focus movement direction. As a result, the row of contents in the non-display region moves into the display frame. Thus, the row of contents that has moved by the movement processing at step 20 is replaced in the display frame. After the loop processing at steps S22 to S26, the process ends.

Figure 16:
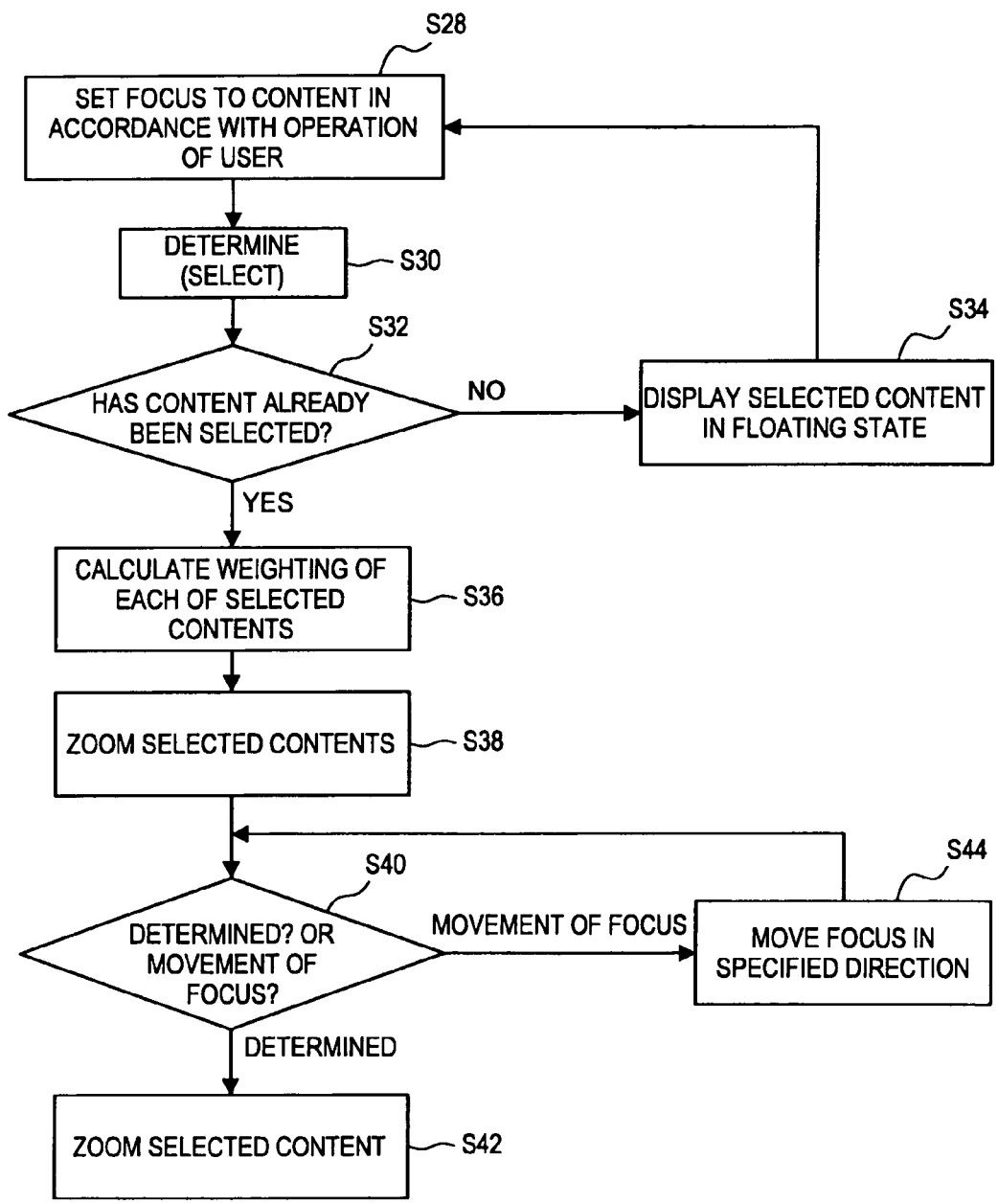
FIG. 16 is a flowchart showing processing when contents displayed as thumbnails are selected and zoomed.

FIG. 16 is a flowchart showing processing when contents displayed as thumbnails are selected and zooming is performed according to weighting. First, at step S28, the focus is set to a content in accordance with an operation by the user. At the next step S30, in accordance with the operation by the user, a desired content is selected while the focus is set thereto. At the next step S32, it is determined whether or not the selected content has already been selected. If the selected content has already been selected, the process proceeds to step S36. On the other hand, if the selected content has not already been selected, the process proceeds to step S34, and the selected content is displayed in a floating state with respect to the non-selected content.

At step S36, the weighting of each of the contents selected at this time point is calculated. As described above, the calculation of the weighting is determined by the weighting processing portion 120 based on meta-information of the content, preference information of the user or the like.

At the next step S38, each of the selected contents is zoomed in accordance with the weighting calculated at step S36. At this time, zooming is performed such that the higher the weighting of each of the selected contents is, the higher the enlargement ratio used for zooming is.

At the next step S40, it is determined whether the focus is set to one of the zoomed contents and the one of the zoomed contents is further clicked and thereby determined, or whether the focus has been moved to another one of the zoomed contents. When one of the zoomed contents is clicked in a state where the focus is set to that content, the process proceeds to step S42 and that content is displayed full-screen. On the other hand, when the focus has been moved to another one of the zoomed contents, the process proceeds to step S44 and the focus is moved in a specified direction.

Figure 17:
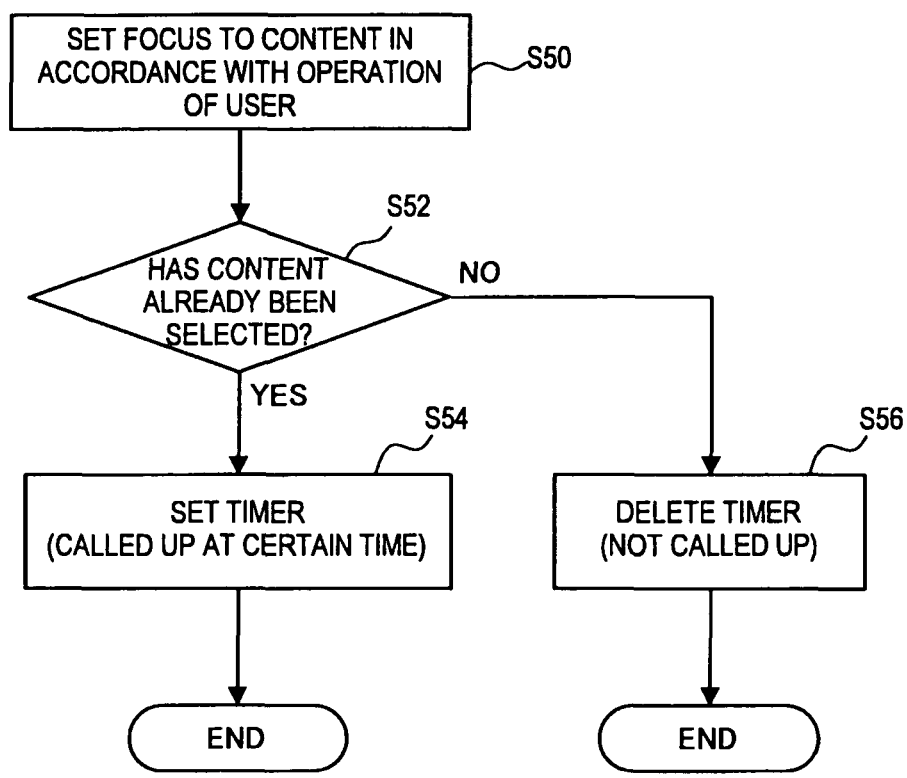
FIG. 17 is a flowchart showing processing when thumbnails are superimposed.

FIG. 17 is a flowchart showing processing when thumbnails are overlapped. First, at step S50, the focus is set to thumbnail contents in accordance with an operation of the user. At the next step S52, it is determined whether or not the focused content has already been selected. When the focused content has already been selected, the process proceeds to step S54, and a timer is set. Thus, a timer count is started for the content that has already been selected. On the other hand, when the focused content has not yet been selected, the process proceeds to step S56, and the timer is deleted.

Figure 18:
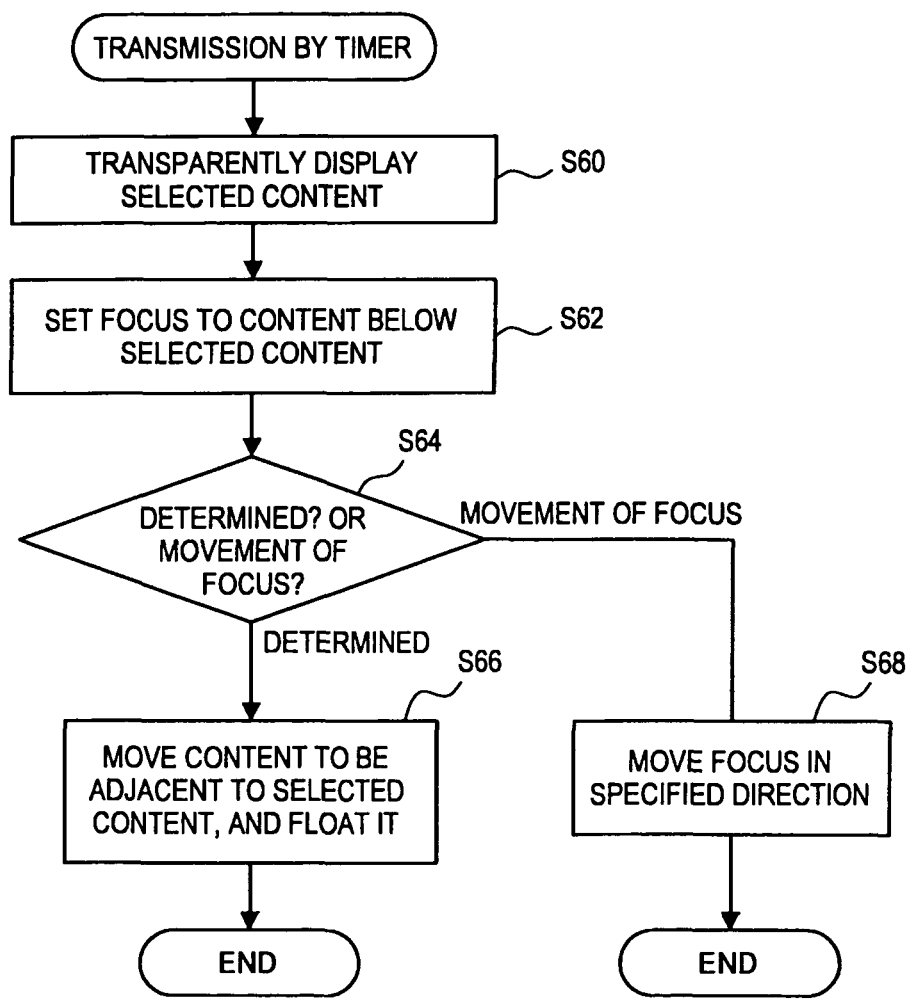
FIG. 18 is a flowchart showing a case in which a predetermined time period has elapsed after a timer count is started at step S54 in FIG. 17, and the timer reaches a transmission time.

FIG. 18 shows a case in which a predetermined time period has elapsed after the timer count is started at step S54 in FIG. 17, and the timer reaches a transmission time. In this case, at step S60, transparency display of the selected content is performed, and the selected content is displayed transparently or semi-transparently. At the next step S62, in accordance with an operation of the user, the focus is set to the content located below (behind) the selected content.

At the next step S64, it is determined whether the focused content located behind is further clicked and thereby selected (determined), or whether the focus has been moved to another content. When the content located behind is selected (determined), the process proceeds to step S66 where the determined content is moved to be adjacent to the transparently (or semi-transparently) displayed content, and is displayed in a floating state. On the other hand, when the focus has been moved, the process proceeds to step S68, and the focus is moved in a specified direction.

7. Screen Region Selection on a Browser Screen

In the above-described embodiment, a case is described in which a desired content is selected from among a plurality of contents obtained from a plurality of broadcast waves. Next, another embodiment that is applied to view a single content will be described. In this embodiment, use of a browser that is an application software to view web pages on the Internet is assumed, and it is assumed that a desired region is cut out and selected on a browser screen.

Figure 19:
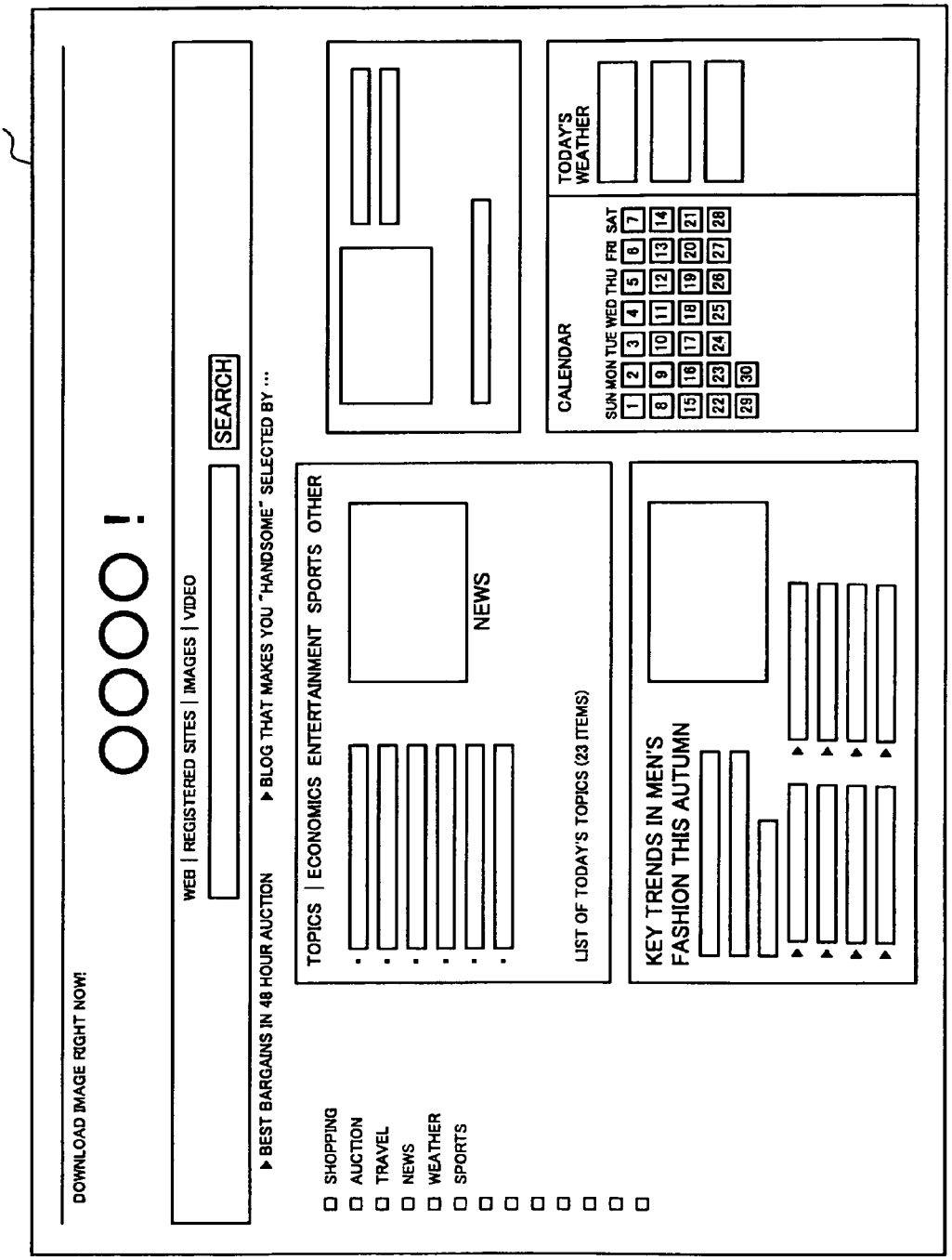
FIG. 19 is a schematic diagram showing a portal site where keyword search is possible, as an example of an Internet browser screen.

FIG. 19 is a schematic diagram showing a portal site where keyword search is possible, as an example of an Internet browser screen. If the user specifies (selects) a desired display region on the screen shown in FIG. 19, the specified region can be stopped at the same position when the screen is scrolled.

Figure 20:
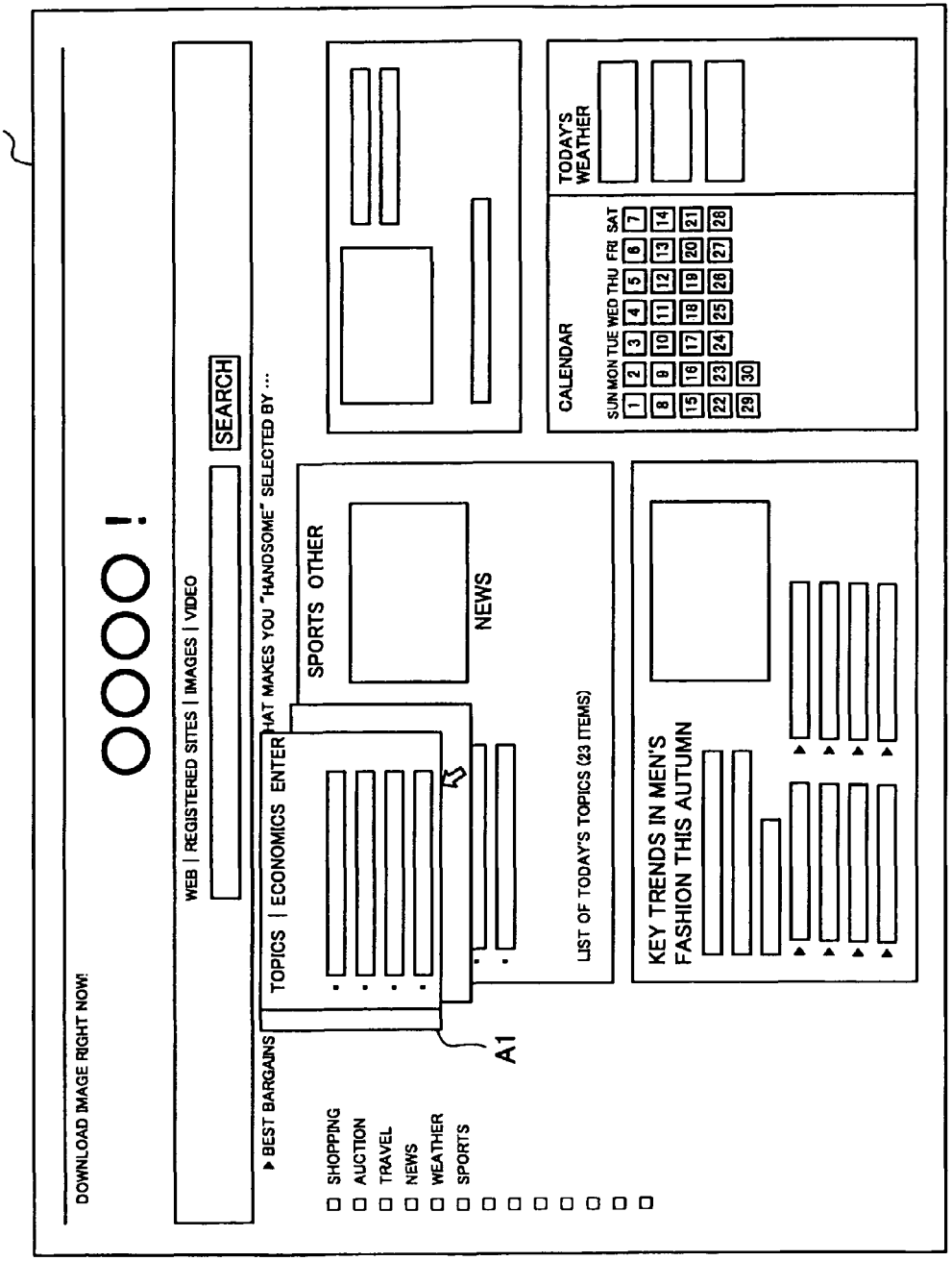
FIG. 20 is a schematic diagram showing a state in which the user has cut out a desired region A1 on the browser screen.

FIG. 20 is shows a state in which the user has cut out a desired region A1 on the browser screen. Here, the region A1 shown in FIG. 20 is cut out by the user moving the cursor. The image of the region A1 is specified as a selected image, and is moved by a predetermined amount in an upper left direction. Here, content selection is performed by the content selection portion 112 of the display control portion 110 selecting a range that is cut out by the movement of the cursor, according to operation information input by the user.

Figure 21:
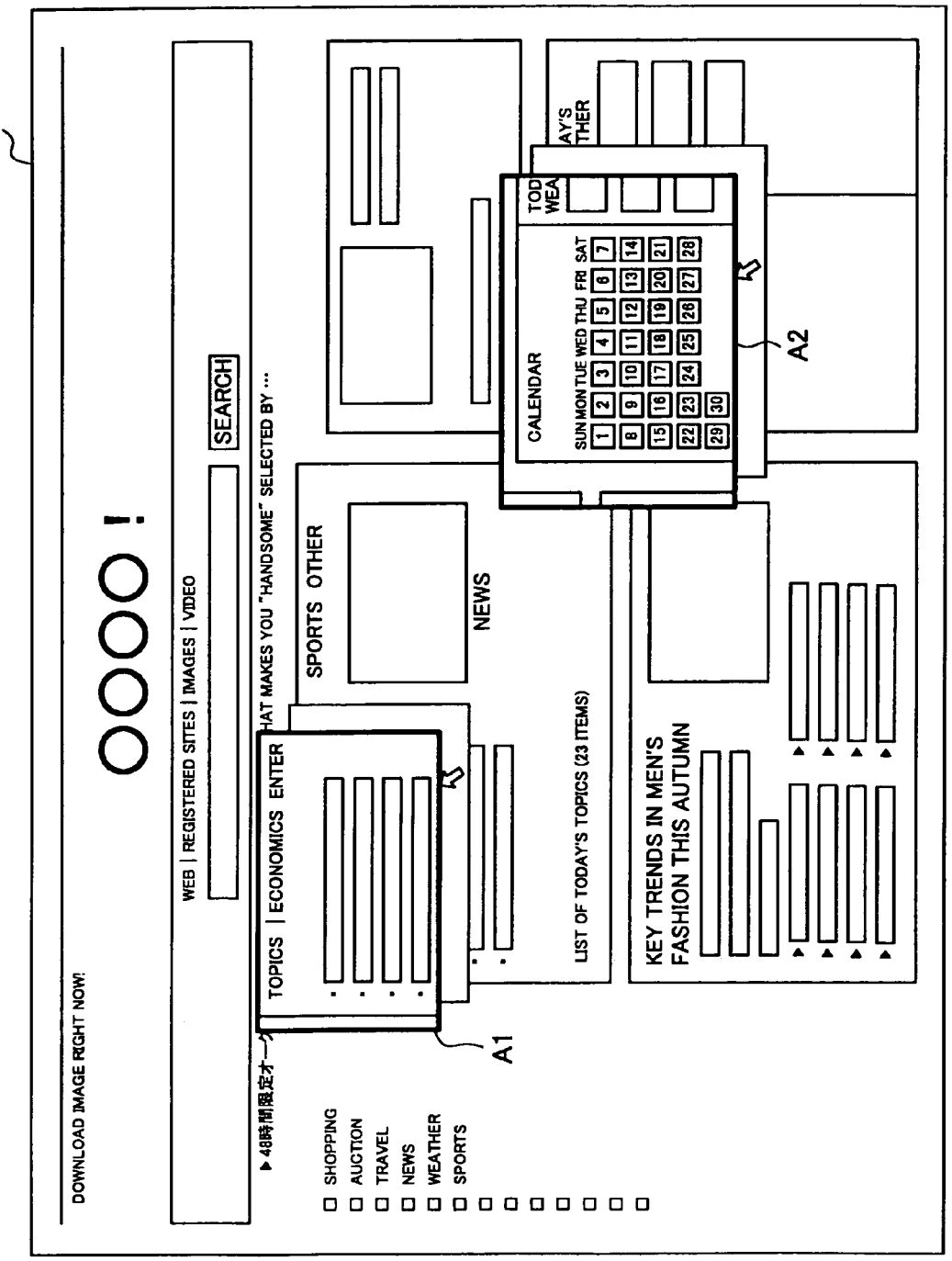
FIG. 21 is a schematic diagram showing a state in which the user has further cut out a region A2 from the state shown in FIG. 20.

FIG. 21 shows a state in which the user has further cut out a region A2 from the state shown in FIG. 20. Here also, the region A2 shown in FIG. 21 is cut out by the user moving the cursor. The image of the region A2 is specified as a selected image, and is moved by a predetermined amount in the upper left direction.

Figure 22:
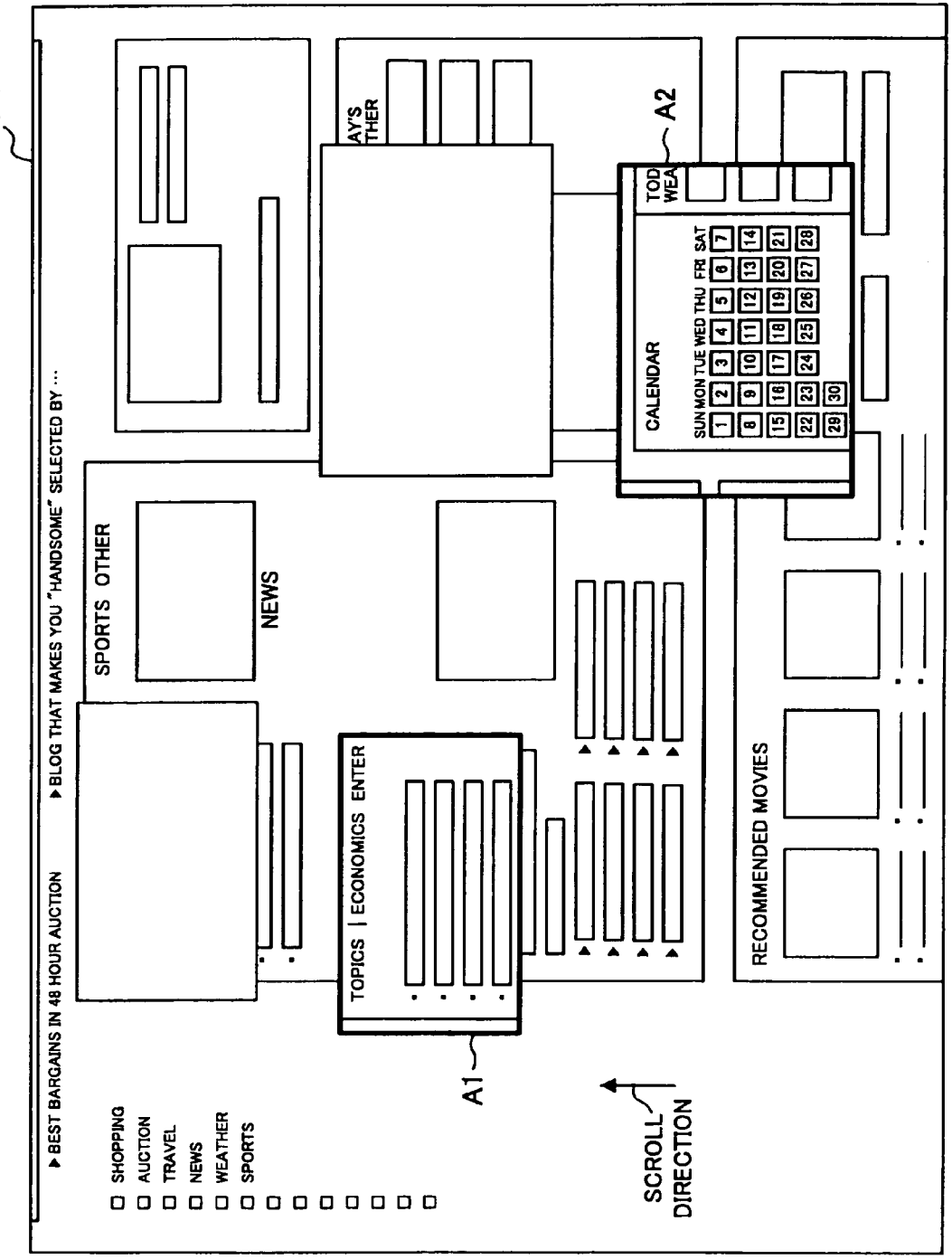
FIG. 22 is a schematic diagram showing a state in which the user has scrolled the screen in an arrow direction from the state shown in FIG. 21.

The display device 100 according to the present embodiment is structured such that, in a state where the regions A1 and A 2 are specified as shown in FIG. 21, when the user scrolls the screen, the selected regions A1 and A2 remain at their positions and only non-selected regions are scrolled. FIG. 22 shows a state in which the user has scrolled the screen in an arrow direction from the state shown in FIG. 21. The scrolling of the screen is performed by the scroll portion 116 of the display control portion 110 scrolling the display screen according to operation information input by the user.

As shown in FIG. 22, even when the screen is scrolled, the selected regions A1 and A2 remain at the same positions without moving. On the other hand, the browser screen except the regions A1 and A2 is scrolled in the arrow direction shown in FIG. 22 in accordance with an operation of the user. Accordingly, the selected regions A1 and A2 do not move to the outside of the screen display region, and the user can look at other images in a state where the user can constantly recognize the selected regions A1 and A2 on the screen. In addition, the user can cut out and select a region that newly appears in the screen display region by scrolling.

As shown in FIG. 22, the positions in which the regions A1 and A2 have originally been located are scrolled in a blank state, because the regions A1 and A2 remain at their positions without moving. Here, the blank positions may be used for another display.

Figure 23:
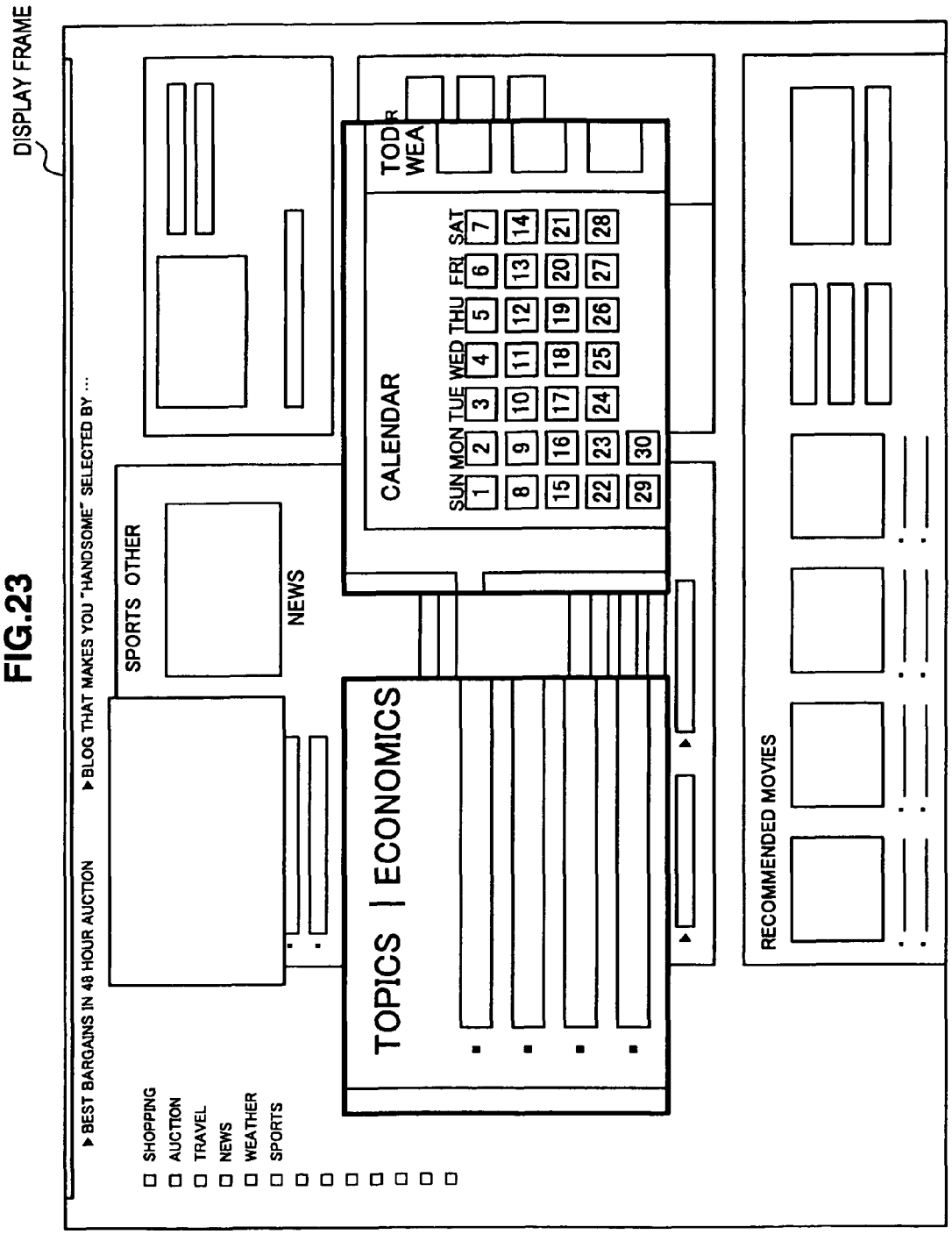
FIG. 23 is a schematic diagram showing a state in which one of the selected regions A1 and A2 is clicked from the state shown in FIG. 22, and zooming is performed.

FIG. 23 shows a state in which one of the selected regions A1 and A2 is clicked from the state shown in FIG. 22, and zooming is performed. As shown in FIG. 23, when one of the selected regions A1 and A2 is clicked, both the selected regions A1 and A2 are enlarged. At this time, the selected regions A1 and A2 are enlarged to have the same size. Further, the respective regions A1 and A2 are evenly arranged in the screen display region so that there is no bias in the arrangement.

As described above, according to the present embodiment, the selected content or display region is displayed such that it is floating with respect to surrounding contents or regions. In addition, even when the screen is scrolled, the selected content is not scrolled. Thus, the user can reliably recognize the selected content.

Further, it is possible to easily confirm content of the selected content by zooming the selected content. Furthermore, when zooming is performed, weighting processing is performed based on meta-information of the content, preference information of the user or the like. Because zooming is performed according to weighting, an image with higher preference of the user can be displayed in a larger size. Consequently, it is possible to significantly improve the convenience of the user.

The exemplary embodiments of the present invention are described above with reference to the appended drawings. However, the present invention is not limited to the above-described examples. It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
an operation input portion from which operation information is received;
a selection portion that selects content at a particular location of a region configured for display on a display screen in response to the operation information, the region configured for display on the display screen includes a display region and a non-display region, the display region being currently displayed on the display screen and the non-display region not being currently displayed on the display screen, the particular location is in the display region when the content is selected, in which selected content is displayed on the display screen in a floating state with respect to non-selected content; and
a scroll portion that scrolls the region configured for display on the display screen except the selected content such that only the non-selected content of the display region and the content of the non-display region move as the region is scrolled and the selected content in the floating state does not move as the region is scrolled.

2. The display device according to claim 1, wherein the region comprises a plurality of contents obtained from broadcast signals, and
the selection portion selects at least one of the plurality of contents.

3. The display device according to claim 1, wherein
the region configured for display on the display screen is a browser screen of a communication network, and
the particular location of the selected content is on the browser screen.

4. The display device according to claim 1, wherein
the selected content is moved from the particular location of the region to a location of the display region, and at least a part of the selected content is superimposed on a non-selected portion of the display region when displayed in the floating state.

5. The display device according to claim 1, further comprising:
a transparency processing portion that applies transparency processing to the selected content after a predetermined time period has elapsed.

6. The display device according to claim 2, further comprising:
an enlargement portion that enlarges the selected content, wherein
when a plurality of contents is selected, the enlargement portion enlarges the plurality of the selected contents to have the same size.

7. The display device according to claim 2, further comprising:
an enlargement portion that enlarges the selected content; and
a weighting processing portion that performs weighting processing of the selected content based on one of meta-information associated with the content and user preference information,
wherein
when a plurality of contents is selected, the enlargement portion enlarges the selected contents in accordance with a result of the weighting processing.

8. The display device according to claim 1, further comprising:
a weighting processing portion that performs weighting processing of the selected content based on one of meta-information associated with the content and user preference information,
wherein
the selected content is moved from the particular location of the region to a location of the display region in accordance with a result of the weighting processing.

9. A display method, comprising the steps of:
receiving as input operation information;
selecting content at a particular location of a region configured for display on a display screen in response to the operation information, the region configured for display on the display screen includes a display region and a non-display region, the display region being currently displayed on the display screen and the non-display region not being currently displayed on the display screen, the particular location is in the display region when the content is selected, in which selected content is displayed on the display screen in a floating state with respect to non-selected content; and
scrolling the region configured for display on the display screen except the selected content such that only the non-selected content of the display region and the content of the non-display region move as the region is scrolled and the selected content in the floating state does not move as the region is scrolled.

10. The display method according to claim 9, wherein
the region comprises a plurality of contents obtained from broadcast signals, and
at least one of the plurality of contents is selected in the selecting step.

11. The display method according to claim 9, wherein
the region configured for display on the display screen is a browser screen of a communication network, and
the particular location of the selected content is selected on the browser screen in the selecting step.

* * * * *